(12) United States Patent
Merold

(10) Patent No.: US 12,282,955 B2
(45) Date of Patent: Apr. 22, 2025

(54) EFFICIENT RESOURCE ALLOCATION IN LATENCY FLOOR IMPLEMENTATION

(71) Applicant: Chicago Mercantile Exchange Inc., Chicago, IL (US)

(72) Inventor: Michael Sean Merold, Sparta, NJ (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 1070 days.

(21) Appl. No.: 17/206,592

(22) Filed: Mar. 19, 2021

(65) Prior Publication Data
US 2022/0301053 A1   Sep. 22, 2022

(51) Int. Cl.
G06Q 40/04   (2012.01)
(52) U.S. Cl.
CPC .................. G06Q 40/04 (2013.01)
(58) Field of Classification Search
CPC ..................................... G06Q 40/04
See application file for complete search history.

(56) References Cited

U.S. PATENT DOCUMENTS

| | | | |
|---|---|---|---|
| 6,996,541 B2 | 2/2006 | Togher et al. | |
| 7,461,026 B2 | 12/2008 | Schluetter | |
| 7,831,491 B2 | 11/2010 | Newell | |
| 8,446,801 B2 | 5/2013 | Kasai et al. | |
| 10,102,577 B2 | 10/2018 | Merold | |
| 10,325,317 B2 | 6/2019 | Melton | |
| 10,432,565 B2 | 10/2019 | Acuña-rohter et al. | |
| 10,614,523 B2 | 4/2020 | Merold et al. | |
| 11,100,577 B1* | 8/2021 | O'Hagan | G06Q 40/00 |
| 2005/0096999 A1 | 5/2005 | Newell | |
| 2015/0127519 A1 | 5/2015 | Melton | |
| 2016/0104242 A1 | 4/2016 | Melton | |
| 2017/0331774 A1 | 11/2017 | Peck-walden | |
| 2018/0330440 A1 | 11/2018 | Melton | |
| 2020/0193518 A1 | 6/2020 | Merold et al. | |
| 2020/0301807 A1* | 9/2020 | Stern | G06Q 11/34 |
| 2021/0049691 A1 | 2/2021 | Howorka et al. | |

FOREIGN PATENT DOCUMENTS

| | | |
|---|---|---|
| EP | 2858318 A1 | 4/2015 |
| EP | 3493142 A1 | 6/2019 |

(Continued)

OTHER PUBLICATIONS

Haynes, et al., in "Precedence rules in matching algorithms," from Journal of Commodity Markets, 2020 (Year: 2020).*

(Continued)

*Primary Examiner* — Eric T Wong
*Assistant Examiner* — Brandon M Duck
(74) *Attorney, Agent, or Firm* — Lempia Summerfield Katz LLC

(57) ABSTRACT

The disclosed embodiments relate to electronic trading system architectures, for processing incoming orders to an electronic trading system, which feature a latency floor mechanism which imparts a delay on incoming orders. In particular, the disclosed embodiments implement a latency floor mechanism which compensates for both latency variations among trader's ability to submit transactions and also variations in the volume of submitted transactions therefrom.

36 Claims, 10 Drawing Sheets

(56) References Cited

FOREIGN PATENT DOCUMENTS

EP          3567541 A1     11/2019
JP        2022505665    *    1/2022   ........... H04L 67/104

OTHER PUBLICATIONS

Eva Szalay, "Life in the Slow Lane", Automated Trader Magazine, https://www.automatedtrader.net/articles/exchange-views/144193/life-in-the-slow-lane, Issue 30, Q3 2013, 3 pages.
John D'Antona, "CHX Proposes New Liquidity Taking Order that Incorporates Delay", Markets Media, Aug. 31, 2016, https://www.marketsmedia.com/chx-proposes-liquidity-order-incorporates-delay/.
Larry Harris et al., "What to Do about High-Frequency Trading", Financial Analysts Journal, Mar./Apr. 2013, vol. 69, No. 2: 6-9.
Extended European Search Report, from EP Application No. 21208555.9, Apr. 7, 2022, EP.

* cited by examiner

EFFICIENT RESOURCE ALLOCATION IN LATENCY FLOOR IMPLEMENTATION

BACKGROUND

Over the last twenty years, electronic trading systems have become commonplace in the financial markets for trading a wide variety of instruments such as equities, foreign exchange (FX) products, commodities and derivatives as well as fixed income products and many other financial instruments.

Trading systems generally ensure open market access to all traders and provide a variety of methods from which traders may choose to connect to the system to send orders and receive market data. In particular, trading systems ensure equitable access to connections (ingress points) to their system and ensure that the network infrastructure of the electronic trading system which carries communications from those connections to the actual systems which implement the electronic market operates in a manner which maintains equitable access.

Traders, who may be located a significant distance away, connect with these electronic trading systems via public and/or private electronic communications networks, which are neither provided by, nor under the control of, the electronic trading systems, which enable traders to submit trade orders and receive the results thereof. However, latency issues, such as inter- and/or intra-network latency variations, may be present in any system connecting parties over large distances, in particular, where some traders are located further from the electronic trading system than others.

Some electronic trading systems use distributed architectures to locate system components geographically proximate to the traders in order to address these latency issues and improve access as compared to centralized systems by minimizing differences in the distance from each trader to a connection to the electronic trading system and/or to the systems which implement the electronic markets so as to minimize the impact of any latency issues. However, other latency issues have been identified which may occur outside of the control of the electronic trading systems, e.g. outside of the electronic trading systems' networks and processing systems.

Generally speaking, traders receive and process information, such as changes to a given market or other event, in order to make trading decisions, i.e. whether or not to submit an order to trade and what that order should contain. Accordingly, as will be described in more detail below, in terms of responding to changes in a market, there are three general latency components, variations in which may affect a trader's ability to capitalize on a given event at all, or as compared with other traders: the latency in learning about the event, e.g. the latency from the time the event occurs until the trader receives data indicative thereof from the electronic trading system; the latency in consuming/processing the received information and generating a suitably responsive order; and the latency in communicating/transmitting the generated order back to the electronic trading system.

For example, the rise of algorithmic trading has highlighted other issues with respect to latency which impact a trader's ability to trade. Algorithmic trading, also known as High Frequency Trading (HFT), replaces human traders with electronic platforms that enter orders automatically in accordance with a trading algorithm. The algorithmic trading generates orders in response to received market data, such as the price or size of orders in the market. Generally, HFT trading attempts to capitalize on/minimize all three areas of latency external to the electronic trading system: receipt of market data from the electronic trading system; processing of received market data to generate one or more transactions responsive thereto; and transmission of those generated transactions back to the electronic trading system.

In both centralized and distributed systems, such as the EBS or CME systems described below, market data/views may be sent to each trading entity, such as a bank's trading floor, periodically giving that trading entity an update of the market/order book for traded instruments. These market views may then be redistributed, in turn, to other traders, or to other trading floors, impacting the first traders/trading floors that receive market views less than traders/floors that receive the views later, and in particular, less than the last trader/trading floor to receive the market update. Latency issues caused in part by the relative proximity of the traders/trading floors to the computers distributing the market data/views external to the electronic trading system can exacerbate this impact differential. This problem is dealt with, to an extent, by the distribution method and apparatus disclosed in U.S. Pat. No. 8,446,801 Howorka et al, the contents of which are incorporated by reference. Howorka et al. introduces a random component into the order in which market updates are distributed so that the time at which a given trading floor receives market data relative to other trading floors gradually changes over time. This approach goes some way to evening out variations in the impact of latency over time.

Thus, known electronic trading systems have used some measures to address latency issues with respect to the receipt of information, referred to as information access, and to address variations in the impact of latency on access to the system which may occur outside of the control of the trading system. However, they are unable to deal with discrepancies in the speed at which parties trading on the system can generate and transmit orders into the system, which is largely out of the control of the trading system operator.

In view of the operational speed of many financial markets, a strong motivation exists for trading entities, such as hedge funds and banks, to invest heavily in hardware, software, and communications technology to ensure that they can respond to market events quickly, e.g. generate appropriate orders responsive to market data, and ensure that their orders reach the trading system as quickly as possible. This approach requires a heavy financial investment on behalf of the trading entities which tends to minimize the impact of latency issues on the larger entities which are more able to make the investment required. The problem can be less severe on systems that operate on a private communications network but worse on systems that use a public network, such as the Internet, where latencies may vary both over time and over distance, both over a single network route and as between multiple network routes, for communications between the trading entities and the trading system.

In particular, in certain scenarios, referred to as "races", the fastest (lowest latency) trader (or trading program) may garner an advantage over other traders, e.g. they may have certainty of achieving their objective. Generally, a market may involve market makers, such as market participants who consistently provide bids and/or offers at specific prices in a manner typically conducive to balancing risk (a market maker may also be referred to as a passive trader and/or one who places trades at prices at which no previously received but unsatisfied counter orders exist at the time the trade order is submitted wherein such orders are most likely not to match with a counter order upon submission and will be rested on/stored in the order book, e.g. as a previously received but not yet satisfied order), and market takers who may be willing to execute transactions at prevailing bids or offers or may be characterized by more aggressive actions so as to maintain risk and/or exposure as a speculative investment strategy (a market taker may also be referred to as an aggressive trader, or aggressor, and/or someone who places trades at prices at which previously received but not yet satisfied counter orders exist at the time the trade order is submitted wherein such orders are most likely to be matched with a counter order upon submission thereby taking those counter orders out of the order book). From an alternate perspective, a market maker may be considered a market participant who places an order to sell at a price at which there is no previously or concurrently provided counter order, thus the order is likely to rest on the order book. A market taker may be considered a market participant who places an order to buy at a price at which there is a previously or concurrently provided counter order, thus the order is likely to trade immediately. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and may also feature high volumes of executed transactions indicating that large quantity orders may be executed without driving prices significantly higher or lower.

The scenarios referred to above may be categorized as a Maker-Maker race, a Maker-Taker race and a Taker-Taker race. In a Maker-Maker race, when a market price falls (or rises), market makers try to submit new offers (or bids) competing for the best position in the order queue at the new lower (higher) price, wherein the fastest market maker becomes the first in the queue at the new price. In a Maker-Taker race, when market price rises (or falls), market makers try to cancel their offers (or bids), while market takers try to trade against them, wherein the fastest trader achieves his objective: The market maker is able to cancel his offer (bid); or the market taker is able to trade against the offer (bid) at good price before the order is cancelled. The Maker-Taker race may be biased toward market takers (as a whole) because—at a given time—there is a limited (small) number of market maker orders, while the number of market taker orders in a salvo unleashed in response to a market price change can be practically unbounded. In a Taker-Taker race, when market price rises (or falls), market takers try to trade against the latent/resting offers (bids), wherein the fastest market taker has the greatest chance of trading with an order at a latent/resting price.

U.S. Pat. No. 7,461,026 assigned to Trading Technologies, Inc. attempts to address the issue of the impact with respect to latency delay affecting information access and turnaround of trade orders. U.S. Pat. No. 7,461,026 is incorporated herein by reference as if set out in full. Market data is sent from a host system to client devices through synchronized local communication services so that data can be displayed simultaneously or near simultaneously at each client device. It will be appreciated that a multicast protocol may be used to achieve the same effect. Transaction data sent from the client devices to the host system also is received via the local communication servers and the ordering of that transaction data is based, at least in part, on when the local communication servers received the transaction data from the client devices, as opposed to when the host system receives that data. The transaction data may include order information and the transaction messages may be prioritized by determining a travel time from a first network device to the host exchange and then determines a similar travel time for a second device. When a transaction message is sent from a first client device the receipt time is determined. Similarly, the receipt time of messages from the second device is measured and the host system can then use the known travel times for the two devices to prioritize the first and second transaction messages at the host exchange.

While this approach goes someway to addressing the issue, it is complex and relies on a fore-knowledge of travel times and a constancy of travel time for repeated transactions from the same device. The approach may not be able to cope well with orders submitted from mobile devices such as tablets or phones which are beginning to be used in the markets as travel time will vary depending on the location of the device.

A Latency Floor (also referred to as Randomization as described in Harris, L. What to Do about High-Frequency Trading. Financial Analysts Journal, March/April 2013, Vol. 69, No. 2: 6-9 and Szalay, E. Life in the slow lane, Automated Trader Magazine Issue 30 Q3 2013, both of which are incorporated by reference in their entireties herein) can be thought of as a limited exception to the time-priority rule an electronic trading venue implements. The outcome of deploying a latency floor mechanism on a venue that operates a central limit order book (CLOB) is that at short timescales, messages are not generally processed against the CLOB (e.g., inserted into it, matched against other orders in it, removed from it, and so on) in the received temporal order. At longer timescales however, messages received earlier are still processed against the CLOB before messages received later. What this implies is that there is a time parameter associated with a latency floor that distinguishes the short timescale from the long timescale, which is sometimes referred to as the "value" of the latency floor.

A latency floor mechanism may work by "batching" up or otherwise buffering messages received within the floor's value, e.g. time or batch window, before those messages are sent to or otherwise reach the match engine/CLOB, shuffling the orders/list of messages in the batch to give the orders/list a new (at least somewhat), such as random or pseudo random, ordering, and then finally processing these messages against the CLOB, i.e. performing the matching process, according to their new ordering. In this way, the order in which the messages are processed against the CLOB is no longer completely determined by the received temporal order and the incentive to traders to get their order in as quickly as possible is reduced as they will be batched with later received orders regardless. Other such mechanisms may instead work by adding a random delay between 0 and a defined maximum/upper bound delay value to each message when it is received and before it can be processed against the CLOB, thereby also causing a new, more random ordering of messages, as described in Harris, L. What to Do about High-Frequency Trading. Financial Analysts Journal, March/April 2013, Vol. 69, No. 2: 6-9.

Latency floor mechanisms which implement batching/ buffering of incoming transactions can suffer from performance issues when a large number of orders are received within a batch window, particularly from one party, which may delay the processing of orders from other parties within the same batch or in subsequent batches of orders.

There is, therefore, a need for an improved approach to the problem of the impact of latency on order entry into electronic trading systems.

DETAILED DESCRIPTION

The disclosed embodiments relate to electronic trading system architectures, for processing incoming orders to an electronic trading system, which feature a latency floor mechanism which imparts a delay on incoming orders. In particular, the disclosed embodiments implement a latency floor mechanism which compensates for both latency variations among trader's ability to submit transactions and also variations in the volume of submitted transactions therefrom.

Figure 6:
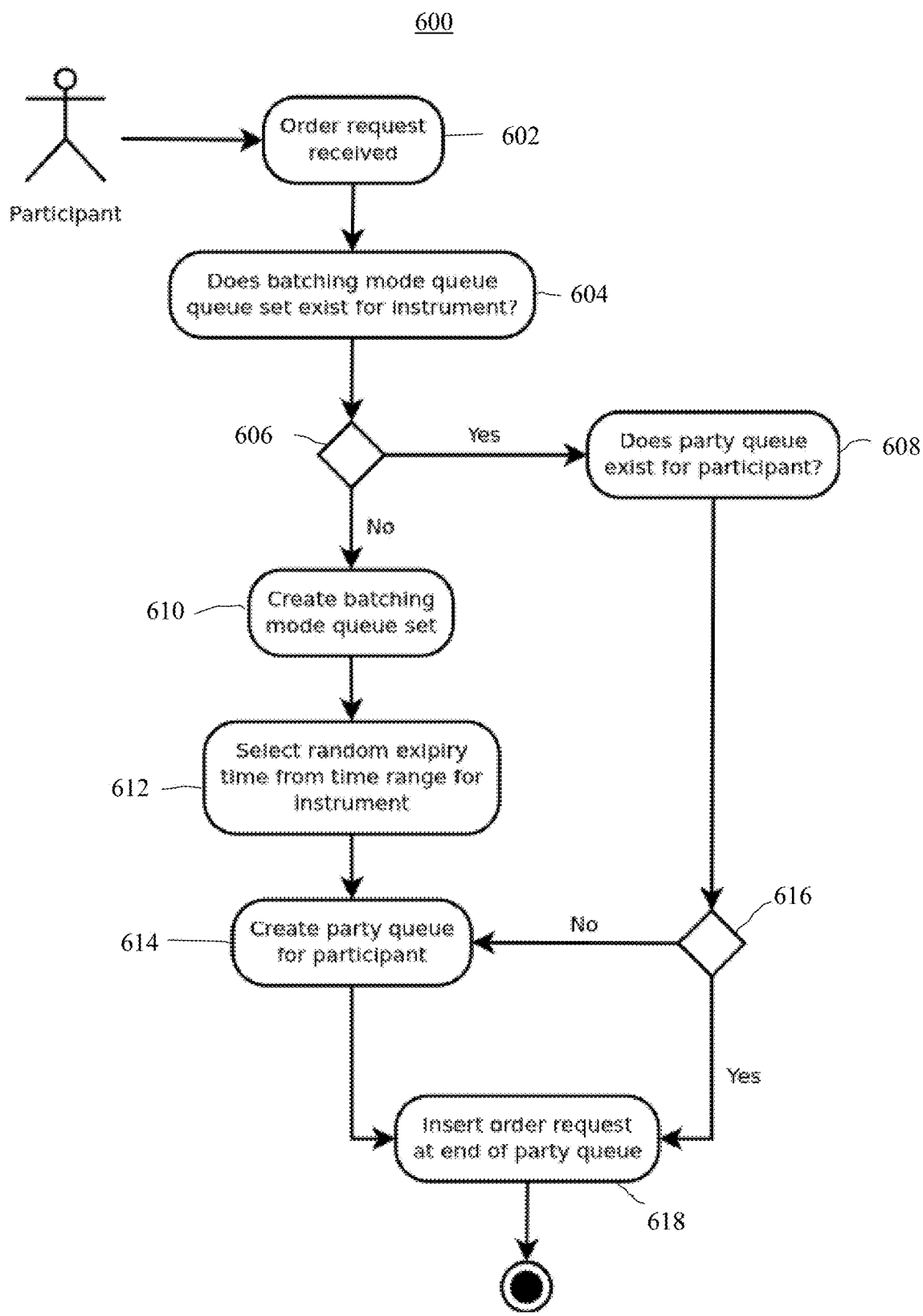
FIG. 6 depicts a flow chart showing operation of the system of FIG. 1 for batching incoming transactions according one embodiment.

In prior latency floor systems, as shown in FIGS. 4, 6-8, generally, order messages received by an electronic trading system implementing a latency floor are processed in batches, accumulations, groups or collections of order messages received over a defined period of time, i.e., the batch window, based on the instrument to which an order message relates. Order messages may include submission of orders to trade a financial instrument, cancel a previously submitted order to trade, and/or modify a previously submitted order to trade, etc. As shown in FIG. 6, described in more detail below, an incoming order message is assigned to/stored, e.g., by a batching/accumulation thread or process, in a queue of a set of queues defined/instantiated for that instrument for the current batch (Blocks 602-618). The incoming order messages may be stored in the queues of the queue set according to a random process or they may be stored in the order of receipt. Where orders are received from related trading parties for a given instrument, they are assigned to/stored in the same queue of the queue set for that instrument, e.g., according to their time of receipt. Accordingly, each batch, or queue set, of order messages contains only those order messages for a particular instrument received during the batch window and are organized into sub-groups, or queues, by the party which sent those order messages to the trading system. Where order messages are received for different instruments during a given batch window, those order messages may be collected/stored/accumulated in different batches (queue sets).

Figure 7:
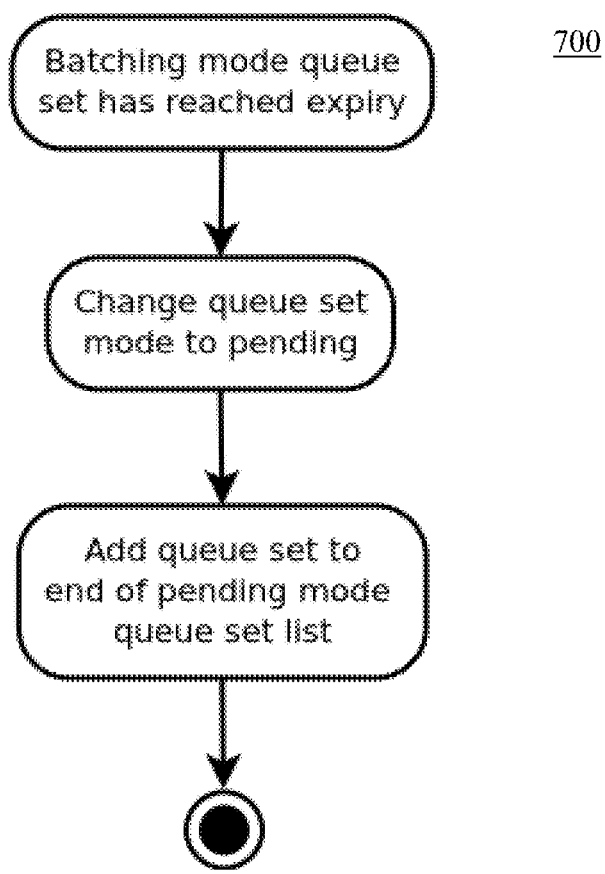
FIGS. 7 and 8 depict flow charts showing operation of a prior latency floor system.

As shown in FIG. 7, the batch window may have a fixed duration or random duration within defined minimum and maximum durations and at the end of the batch, i.e., upon expiration of the duration, all of the order messages received/collected during the batch window and held in the queues are stored, e.g., by a batch expiration process or thread, pending transmission to the matching engine for processing while a new batch window is initiated for collection of subsequently received order messages, and the order messages of the batch are subsequently transmitted, e.g., by a processing thread or process, to the matching engine to be processed.

Figure 8:
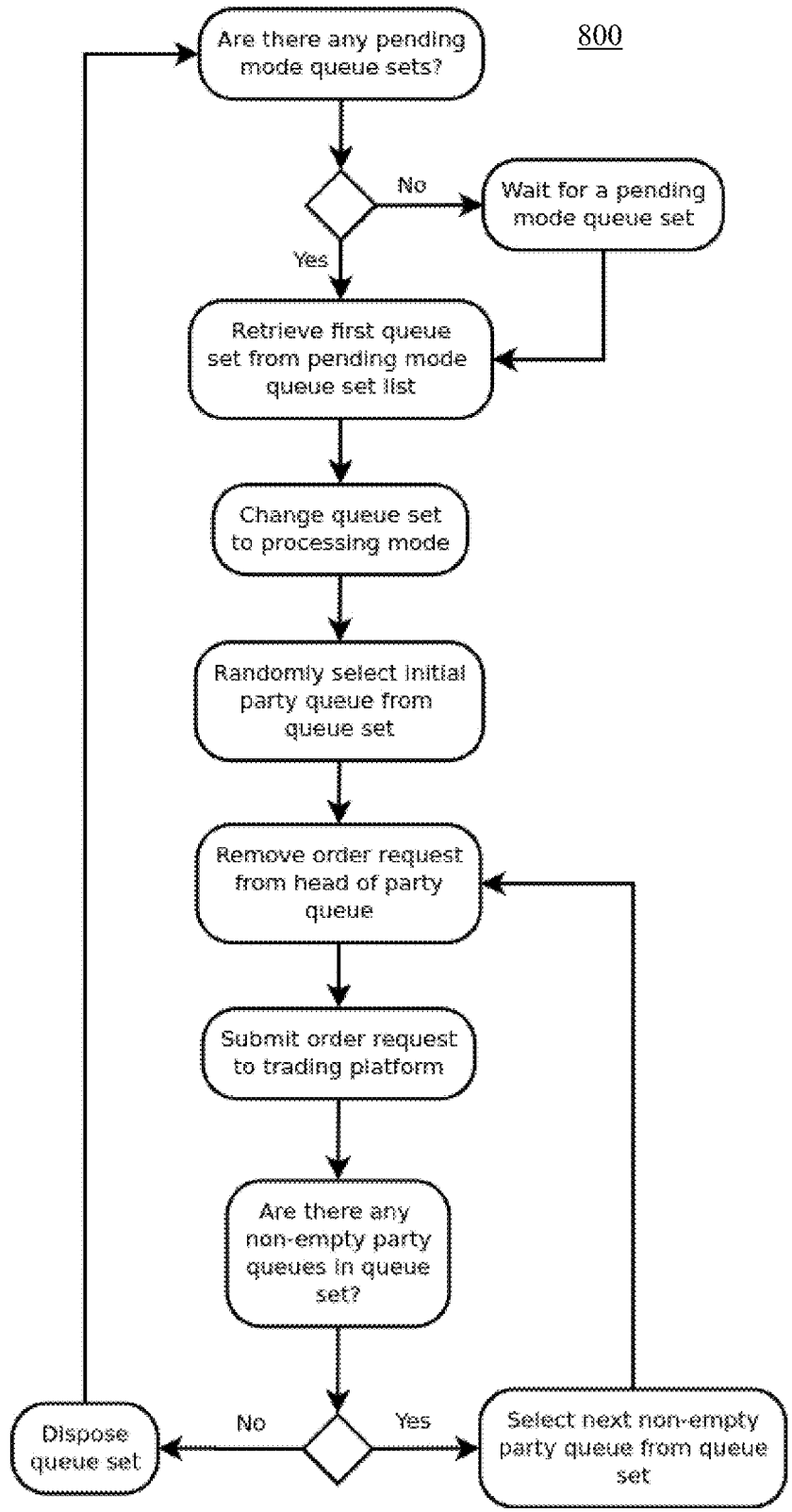

As shown in FIG. 8, in one embodiment, the collected order messages are transferred/transmitted to a matching thread of the trading system sequentially with one order being transmitted (and subsequently removed) from each queue of the queue set, starting with a randomly selected queue, in turn until all of the collected order messages of the queue set have been exhausted. For more detail, see U.S. Pat. No. 10,102,577 incorporated by reference herein.

In such a system, as shown in FIGS. 7 and 8, after the current batch window has expired, the collected incoming orders of the batch, i.e., for a particular instrument, are processed to submit them to the match engine until all of the incoming orders in the batch are exhausted. The system then waits for the next batching window to end for more incoming orders to forward to the matching engine. Assuming all of the orders of a given batch can be processed prior to the end of next batching window, then no processing delays may be incurred. However, should the next batch window end, e.g., due to the random duration and/or due to delays in processing the current batch of orders, before all of the orders of the current batch have been processed to the match engine, the next batch has to wait.

Where one or more traders submit a high volume of transactions during a particular batch window, an unusually large batch of orders may need to be processed, thereby delaying the processing of subsequent batches of incoming orders. This may, for example, allow one or more traders to dominate the processing of transactions by submitting a large volume of transactions in a single batch, such as a large volume or orders, each for a portion of the overall desired quantity (as opposed to a single order for the entire desired quantity).

Figure 5:
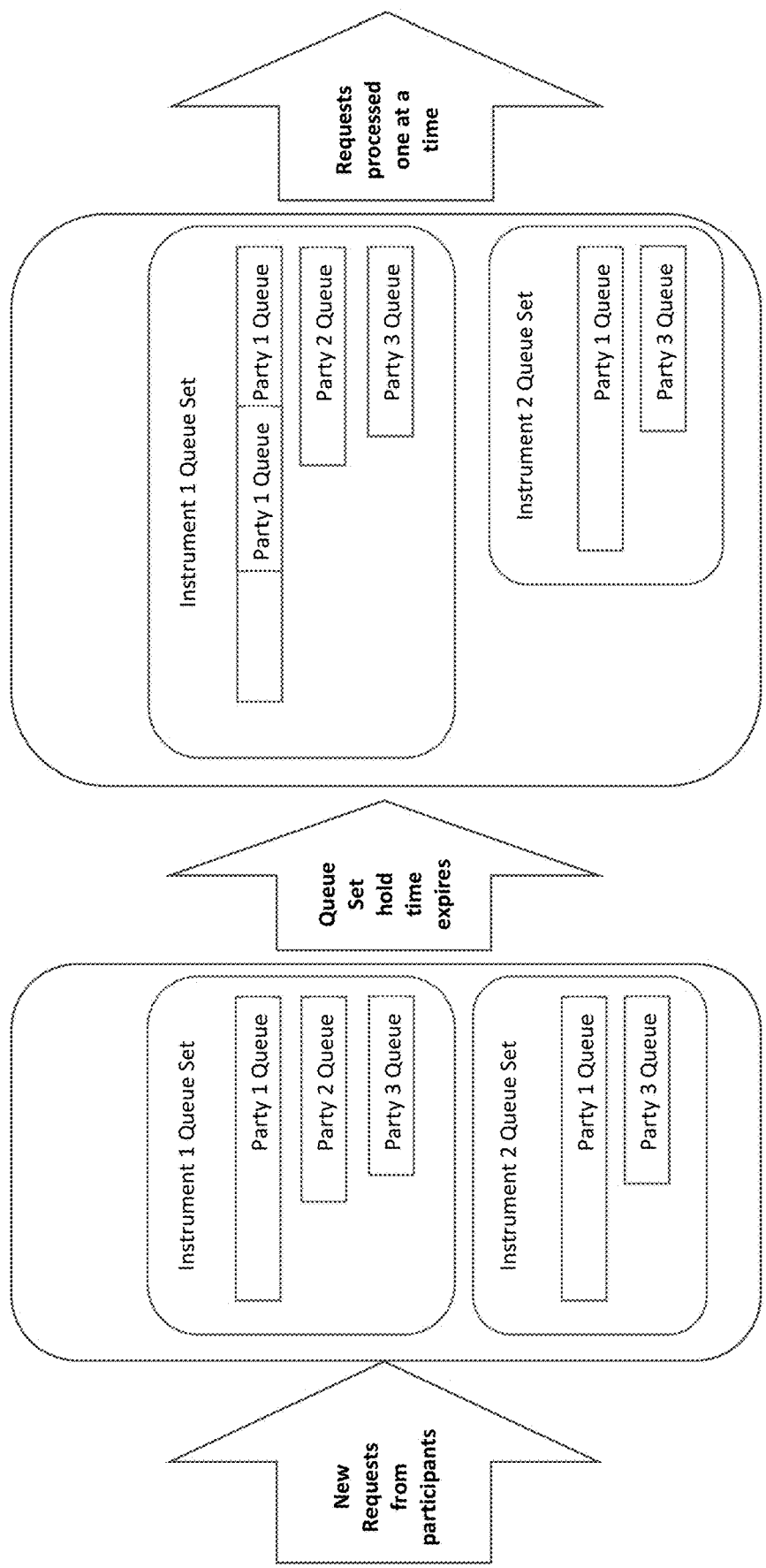
FIG. 5 illustrates the operation of the system of FIG. 3 according to one embodiment.

As shown in FIG. 5 and described in more detail below, the disclosed embodiments similarly batch incoming electronic order messages but further provide a latency floor mechanism which mitigates delay of processing subsequent batches of incoming orders due to a large volume of orders arriving in a single batch. In the disclosed embodiments, upon the expiration of each batch window, rather than having to wait for a prior batch of incoming orders to be processed, the incoming orders received during the most recent expiring batch window are appended or otherwise added to the queues holding the order messages of the prior batch(es), e.g., added/appended behind or at the end, awaiting processing to the match engine, wherein, as noted above, orders received from the same party for a given instrument are appended to/stored in the same queue while orders from a new party and/or new instrument are stored in new, e.g., empty or newly instantiated, queues. When processing the accumulated/collected incoming order messages to the match engine, the disclosed embodiments process one order from each queue for each instrument (queue set) in turn. Thereby, a large number of orders received from one party for one instrument will not unduly delay the processing of orders received from other parties for the same or a different instrument. Instead, such a large volume order messages merely delays the later received order messages of the same party for the particular instrument.

The disclosed embodiments provide a technical improvement over other latency variation mitigation mechanisms, e.g., mechanisms which attempt to minimize the impact of variations in external network latency and order processing capacity across all traders, by also mitigating processing delays due to disparities in message submission volumes.

One aspect of the disclosed embodiments, as described below, provides a computerized method for controlling/moderating submission of electronic order messages to an electronic trading system for matching. Electronic order messages for trading an instrument are received at a server of said electronic trading system from parties trading on the electronic trading system. A message batch, i.e., batch window, is initiated, the message batch having a defined duration which may be random. Prior to expiration of the message batch, received electronic order messages are stored in a storage device of the server such as a memory. The order messages may be stored in said storage device in an order unrelated to the order in which they were received at the electronic trading system. After expiry of the defined duration of the batch, the stored order messages are submitted to a matching engine of the electronic trading system, e.g., in the order in which they are stored in the storage device as described herein.

In one embodiment, by submitting stored order messages to the matching engine in an order unrelated to the order in which they were received at the electronic trading system, the importance of the transmission path between the parties and the electronic trading system is reduced. This in turn de-emphasizes the need for highly sophisticated systems for ensuring the fastest possible order submission from a party's trading computer or the trading floors at which the parties on the system reside to the electronic trading system. Thus, fairness of access to the system is increased by increasing the likelihood that, for example, smaller participants will have their orders matched even if they were submitted using less sophisticated systems than orders submitted by larger institutions.

The disclosed embodiments may be implemented in association with a data transaction processing system that processes data items or objects, such as an exchange computing system which implements electronic trading, also referred to as an electronic trading system. Customer or user devices (e.g., client computers) may submit electronic data transaction request (order) messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be orders to request/perform transactions, e.g., buy or sell a quantity/amount of a product at a specified price. Products, e.g., financial instruments, or order books representing the state of an electronic marketplace for a product, may be represented as data objects or data structures within the exchange computing system. The instructions may also be conditional, e.g., buy or sell a quantity of a product at a given value if another trade for the product is executed at some other reference value.

The exchange computing system may include one or more hardware matching processors/engines that match, or attempt to match, the electronic data transaction request messages with other previously received, but not yet fully satisfied, electronic data transaction request messages counter thereto. Incoming electronic data transaction request messages may be received from different client computers over a data communication network and output electronic data transaction result messages, generated as a result of the processing of those incoming electronic data transaction request messages, may be transmitted to the client computers via that same, or a different, data communications network, and may be indicative of results of the attempts to match the incoming electronic data transaction request messages.

The specifically configured matching processors, also referred to as matching engines or match engines, may additionally generate information indicative of a state of an environment (e.g., the state of the order book) based on the processing of the electronic data transaction request messages, and report this information to data recipient computing systems via outbound messages published via private or public data feeds that contain electronic data transaction result messages. While the disclosed embodiments may be described with respect to electronic data transaction request and result messages, it will be appreciated that the disclosed embodiments may be implemented with respect to other technologies or messaging mechanisms later developed.

For example, one exemplary environment where the disclosed embodiments may be desirable is in financial markets, and in particular, electronic financial exchanges, also referred to as electronic trading systems, such as the Chicago Mercantile Exchange Inc. (CME).

An electronic financial exchange provides one or more markets for the purchase and sale of various types of products including financial instruments such as stocks, bonds, futures contracts, options, currency, cash, swaps and other similar instruments. Agricultural products and commodities are also examples of products traded on such exchanges. A futures contract is a product that is a contract for the future delivery of a financial instrument such as a quantity of grains, metals, oils, bonds, currency, or cash settled against a rate. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. For some types of products (e.g., variable commodities), the specification may further define variables, step sizes, premiums, or discounts for use in processing orders. As will be described, the exchange may further define the matching algorithm, or rules, by which incoming orders will be matched/allocated to resting orders.

Generally, as was described above, a market may involve market makers, such as market participants who consistently provide bids and/or offers at specific prices in a manner typically conducive to balancing risk, and market takers who may be willing to execute transactions at prevailing bids or offers or may be characterized by more aggressive actions so as to maintain risk and/or exposure as a speculative investment strategy. From an alternate perspective, a market maker may be considered a market participant who places an order to sell at a price at which there is no previously or concurrently provided counter order, i.e., an order that is likely to rest in the order book to await a suitable subsequently submitted counter order. A market taker may be considered a market participant who places an order to buy at a price at which there is a previously or concurrently provided counter order, i.e., an order that is likely to match with a currently resting order in the order book such as that placed by a market maker A balanced and efficient market may involve both market makers and market takers, coexisting on a mutually beneficial basis. This mutual existence, when functioning properly, may facilitate liquidity in the market such that a market may exist with "tight" bid-ask spreads (e.g., small difference between bid (buy) and ask (sell) prices) and may also feature high volumes of executed transactions indicating that large quantity orders may be executed without driving prices significantly higher or lower.

A financial instrument electronic trading system, such as a futures exchange, such as the Chicago Mercantile Exchange Inc. (CME), provides a contract market where financial instruments, e.g., futures and options on futures, are traded using electronic systems. "Futures" is a term used to designate contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price on or before a certain expiration date. An option contract offers an opportunity to take advantage of futures price moves without actually having a futures position. The commodity to be delivered in fulfillment of the contract, or alternatively the commodity for which the cash market price shall determine the final settlement price of the futures contract, is known as the contract's underlying reference or "underlier." The underlying or underlier for an options contract is the corresponding futures contract that is purchased or sold upon the exercise of the option.

Typically, the terms and conditions of each futures contract are standardized as to the specification of the contract's underlying reference commodity, the composition of the commodity, quantity, delivery date, and means of contract settlement. In embodiments described herein, terms and conditions of each futures contract may be partially standardized as to the specification of the contract's underlying reference commodity and attributes thereof. The underlying reference commodity may include a range of possible qualities, quantities, delivery dates, and other attributes. For a spot market transaction, the underlying quality and attributes may be set, while a futures contract may provide predetermined offsets to allow for possible settlement of a non-conforming delivery. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts, and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and reduces risk of financial loss due to breach of contract by assuring performance on each contract. A clearing member is a firm qualified to clear trades through the clearing house.

An exchange computing system may operate under a central counterparty model, where the exchange acts as an intermediary between market participants for the transaction of financial instruments. In particular, the exchange computing system interposes itself into the transactions between the market participants, i.e., splits a given transaction between the parties into two separate transactions where the exchange computing system substitutes itself as the counterparty to each of the parties for that part of the transaction. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

A match engine, which may also be referred to herein as a module or match/matching engine processor, within an exchange trading system may comprise a transaction processing system that processes a high volume, e.g., millions, of messages or orders in one day. The messages are typically submitted from market participant computers. Exchange match engine systems may be subject to variable messaging loads due to variable market messaging activity. Performance of a match engine depends to a certain extent on the magnitude of the messaging load and the work needed to process that message at any given time. An exchange match engine may process large numbers of messages during times of high-volume messaging activity. With limited processing capacity, high messaging volumes may increase the response time or latency experienced by market participants.

Electronic messages such as incoming messages from market participants, i.e., "outright" messages, e.g., electronic trade/order messages, etc., are sent from client devices associated with market participants, or their representatives, to an electronic trading or market system, e.g., via an electronic communications network.

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing to buy or sell various quantities of that product. As such, as used herein, an order book for a product may also be referred to as a market for that product.

Upon receipt, either immediately or via the disclosed latency floor systems, of an incoming order to trade in a particular financial instrument, whether for a single-component financial instrument, e.g., a single futures contract, or for a multiple-component financial instrument, e.g., a combination contract such as a spread contract, a match/matching engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book, e.g. an order cancelation message or order modification message.

If the matching engine identifies one or more suitable previously received but unsatisfied counter orders, they, and the incoming order, are matched to execute a trade therebetween to at least partially satisfy the quantities of one or both of the incoming order or the identified previously received orders. The identification of one or more suitable previously received but unsatisfied counter orders is performed according to a priority algorithm such as price/time, e.g., orders are identified as suitable based on their price and time of receipt, price/size/time, e.g., orders are identified as suitable based on their price, quantity and time of receipt, or other priority/matching algorithm known in the industry. If there remains any residual unsatisfied quantity of the identified one or more previously received orders, those orders are left on the order book with their remaining quantity to await a subsequent suitable counter order, i.e., to rest. If the matching engine does not identify a suitable previously received but unsatisfied counter order, or the one or more identified suitable previously received but unsatisfied counter orders are for a lesser quantity than the incoming order specifies, the incoming order is placed on the order book, referred to as "resting", with original or remaining unsatisfied quantity, to await a subsequently received suitable order counter thereto. Where more than one suitable previously received but unsatisfied counter order are identified as matching the incoming order but the combined quantity of the identified orders exceeds the quantity of the incoming order, one or more of the identified resting orders will not be completely satisfied by the incoming order. Accordingly, the matching engine may apply an allocation algorithm, such as price-time, pro rata, or a combination thereof, to determine the extent to which the quantity of each of the identified resting orders will be matched to satisfy the incoming order. The matching engine then generates match event data reflecting the result of this matching process. Other components of the electronic trading system, as will be described, then, based on this match event data, generate the respective order acknowledgment(s), e.g., private messages to let the particular market participants know what happened to their orders, and market data messages, e.g., public messages to let all market participants know what changed in the order book database, and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." As there is no guarantee that a suitable counter order will be identified, this process of searching the order book database and evaluating orders, etc., is often referred to as an "attempt" to match. A match event may occur, for example, when an aggressing order matches with a resting order. In one embodiment, two orders match because one order includes instructions for, or specifies buying a quantity of, an instrument at a price, and the other order includes instructions for, or specifies selling, a (different or same) quantity of the instrument at a same or better price. It should be appreciated that, as noted, performing an instruction associated with a message may include attempting to perform the instruction. Whether or not an exchange computing system is able to successfully perform an instruction may depend on the state of the electronic marketplace.

While the disclosed embodiments will be described with respect to a product-by-product or market-by-market implementation, e.g., implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

While the disclosed embodiments may be discussed in relation to futures and/or options on futures trading, it should be appreciated that the disclosed embodiments may be applicable to any equity, fixed income security, currency/foreign exchange (FX), commodity, swap, options or futures trading system or market, bilateral credit based or not, now available or later developed. It may be appreciated that a trading environment, such as a futures exchange as described herein, implements one or more economic markets where rights and obligations may be traded. As such, a trading environment may be characterized by a need to maintain market integrity, transparency, predictability, fair/equitable access, and participant expectations with respect thereto. In addition, it may be appreciated that electronic trading systems further impose additional expectations and demands by market participants as to transaction processing speed, latency, capacity, and response time, while creating additional complexities relating thereto. Accordingly, as will be described, the disclosed embodiments may further include functionality to ensure that the expectations of market participants are met, e.g., that transactional integrity and predictable system responses are maintained.

Financial instrument trading systems allow traders to submit orders and receive confirmations, market data, and other information electronically via electronic messages exchanged using a network. Electronic trading systems offer an efficient, fair and balanced market where market prices reflect a true consensus of the value of products traded among the market participants. Electronic marketplaces use electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus, the electronic marketplace may conduct market activities through electronic systems.

As may be perceived/experienced by the market participants from outside the exchange or electronic trading system operated thereby, the following sequence describes how, at least in part, information may be propagated in such a system and how orders may be processed: (1) An opportunity is created at a matching engine of the exchange, such as by placing a recently received but unmatched order on the order book to rest; (2) The matching engine creates an update reflecting the opportunity and sends it to a feed engine; (3) The feed engine multicasts it to all of the market participants to advertise the opportunity to trade; (4) The market participants evaluate the opportunity and each, upon completion of their evaluation, may or may not choose to respond with an order responsive to the resting order, i.e., counter to the resting order; (5) The exchange gateway receives any counter orders generated by the market participants, sends confirmation of receipt back directly to each submitting market participant, and forwards the received orders to the matching engine; and (6) The matching engine evaluates the received orders and matches the first arriving order against the resting opportunity and a trade is executed.

As used herein, a financial message, or an electronic message, refers both to messages communicated by market participants to an electronic trading or market system and vice versa. The messages may be communicated using packets or other techniques operable to communicate information between systems and system components. Some messages may be associated with actions to be taken in the electronic trading or market system.

Financial messages communicated to the electronic trading system, also referred to as "inbound" messages or electronic order messages, may include associated actions that characterize the messages, such as trade orders, order modifications, order cancellations and the like, as well as other message types. Inbound messages may be electronically communicated from client devices associated with market participants, or their representatives, e.g., electronic trade order messages, etc., to an electronic trading or market system. For example, a market participant may submit an electronic message to the electronic trading system that includes an associated specific action, e.g. order to trade, to be undertaken by the electronic trading system, such as entering a new trade order into the market or modifying or canceling an existing order in the market. In one embodiment, if a participant wishes to modify a previously sent request, e.g., a prior order which has not yet been processed or traded, they may send a request message comprising a request to modify the prior request. In one exemplary embodiment, the incoming request itself, e.g., the inbound order entry, may be referred to as an iLink message. iLink is a bidirectional communications/message protocol/message format implemented by the Chicago Mercantile Exchange Inc. As used herein, the terms/phrases order, order message, trade order message, electronic trade/order message, electronic data transaction request or data transaction request may be used interchangeably to refer to requests, and/or electronic data indicative thereof, electronically sent/communicated to, communicated among components thereof, and/or processed by, an electronic trading system and/or matching engine thereof as described herein to place and/or process orders to trade financial instruments or modify or cancel such orders, etc.

Financial messages communicated from the electronic trading system, referred to as "outbound" messages, may include messages responsive to inbound messages, such as confirmation messages, or other messages such as market update messages, quote messages, and the like. Outbound messages, or electronic data transaction result messages, may be disseminated via data feeds.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. In one embodiment, an electronic order book may be understood to be an electronic collection of the outstanding or resting orders for a financial instrument.

For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order, or an electronic data transaction result message. This response may take the form of a report of the specific change to the order book, e.g., an order for quantity X at price Y was added to the book (referred to, in one embodiment, as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order (FOK), also known as an immediate or cancel order, or other conditional request may not have an immediate market impacting effect, if at all, until the requisite conditions are met.

An acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market by Price "MBP", or Market by Order "MBO"). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

For additional details and descriptions of different market data feeds, see U.S. Patent Publication No. 2017/0331774, filed on May 16, 2016, entitled "Systems and Methods for Consolidating Multiple Feed Data", assigned to the assignee of the present application, the entirety of which is incorporated by reference herein and relied upon.

It should be further appreciated that various types of market data feeds may be provided which reflect different markets or aspects thereof. Examples of the various types of market data feeds which may be provided by electronic trading systems, such as the CME, in order to provide different types or subsets of market information or to provide such information in different formats include Market By Order, Market Depth (also known as Market by Price to a designated depth of the book), e.g., CME offers a 10-deep market by price feed, Top of Book (a single depth Market by Price feed), and combinations thereof. There may also be all manner of specialized feeds in terms of the content, i.e., providing, for example, derived data, such as a calculated index.

Many types of electronic trading systems exist, using different trading models. Examples include RFQ (Request for Quote) based systems, anonymous matching systems and auction based systems. An example of anonymous matching system is disclosed in U.S. Pat. No. 6,996,541 Togher et al, the content of which is incorporated herein by reference. Togher describes a distributed matching system in which traders connected to the system through a communications network submit orders into the system to buy or sell financial instruments. Maker orders are displayed to other traders on the system who can respond to those orders with their own orders which will be matched with the visible maker orders in accordance with matching rules to execute a trade. Typically, the system will receive maker orders from all parties and construct an order book based, for example, an order price and time of order receipt. For ease of interpretation only the best order or best few orders will be displayed to other traders on their screens and counterparty traders respond to the best orders they see.

Many trading systems, such as the electronic trading system provided by the Chicago Mercantile Exchange Inc., are based on a centralized host computer, or, alternatively, multiple distributed host computers, which matches incoming maker and taker orders, maintains order books and administers credit limits. Generally, when an incoming order is received, the trading system accesses a database, referred to as an orderbook, containing data indicative of resting, i.e. previously received but not yet fully satisfied or canceled, orders. If a suitable order counter to the incoming order is found in the order book, a match is made and the two orders are traded. The state of the orderbook, i.e. the current set of resting orders, is provided to market participants via a market data feed which conveys data indicative of the order book state and/or changes thereto, i.e. to advertise to the market participants those orders that are currently available to trade.

As was described above, a market maker, also referred to as a passive trader, is generally a trader who places an order at a price at which there are no presently resting orders, i.e. an order that the trade knows will not match with a currently resting order and therefore will itself be placed in the orderbook as a resting order, also referred to as a passive order, and, via the market data feed, be advertised to the other traders. A market taker, also referred to as an aggressor or aggressive trader, is generally a trader who places an order that they know is counter to currently resting order with the goal of matching and trading against that resting order. In some trading systems, market takers may outnumber market makers by 20 to 1 or more. In some trading systems, the operators of the trading system may provide incentives to encourage traders to be market makers.

The host computer also may be responsible for distributing market related data, generating deal tickets or other confirmation messages after a trade has been executed and maintaining records of activity on the system. Some trading systems, such as the systems described in Togher et al mentioned above, may operate as a distributed model in which the matching engine is split into, or otherwise replicated among, a number of separate matching engines. This approach may be attractive in a global trading system where latency issues can have an impact on access to a centralized system from different parts of the world. The Togher et al distributed system, as implemented by ICAP Plc in its EBS trading platform, has a number of matching engines each located geographically in a main financial market. As these markets operate at different times of the day, many of the trades will be between parties who are operating in the same geographical region and the matching may be performed locally at the regional matching engine. Other trades may involve two separate matching engines in two separate geographical regions. An example would be a trade conducted in the afternoon in London between a London based trader and a New York based trader where it is the morning and the markets are open.

In the embodiments illustrated in the Figures, the electronic trading system is an electronic brokerage system for facilitating the buying and selling of financial instruments such as foreign exchange (FX) spot products or precious metals, equities, futures and/or options contracts. Although the present technology may be described in the context of FX Spot and metals trading, the invention is not linked to the trading of any particular financial instrument and is applicable to trading of any financial instrument via a centralized or distributed electronic trading system including, but not limited to, foreign exchange products, precious metals, equities, derivatives such as futures contracts, options contracts (including options on futures), swaps, forward, as well as commodities, cash instruments, securities, long and short term debt and repurchase agreements.

Moreover, the technology is not limited to the trading of financial or non-financial products and is applicable to any system in which the relative time of access to a computer system is important. The technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

The system to be described is an anonymous trading system. Again, the technology and disclosure is not limited to any particular system architecture and may be used with a host based system such as that of U.S. Pat. No. 7,461,026 or any other system architecture, including systems with a centralized matching engine or where the matching functionality is replicated and/or split among multiple distributed matching engines. An anonymous system is one in which the identity of the parties to a trade is not known to the participants, at least, in some implementations, until a trade has been agreed. The invention may also be used in systems which are completely anonymous or not anonymous.

In particular, the disclosed embodiments may be used with systems, such as the Togher et al system referred to above, and the system described herein, where firm orders are submitted for execution and these orders will be dealt unless the order fails to meet one of a number of predetermined criteria such as the availability of sufficient credit for the trade at one of the potential parties to the trader. Alternatively, the disclosed embodiments may be used with central counterparty based electronic trading systems, such as the CME system referred to above, where the electronic trading system guarantees performance of the transacting parties, i.e. margin is used to obviate the need for a bilateral credit relationship. Accordingly, the disclosed embodiments are not limited to systems submitting firm orders for execution and may be used with any other order entry system including systems which operate on the basis of RFQs or in which matches are negotiated following an initial identification of a possible match.

The embodiments may be described in terms of a distributed computing system. The examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

Figure 1:
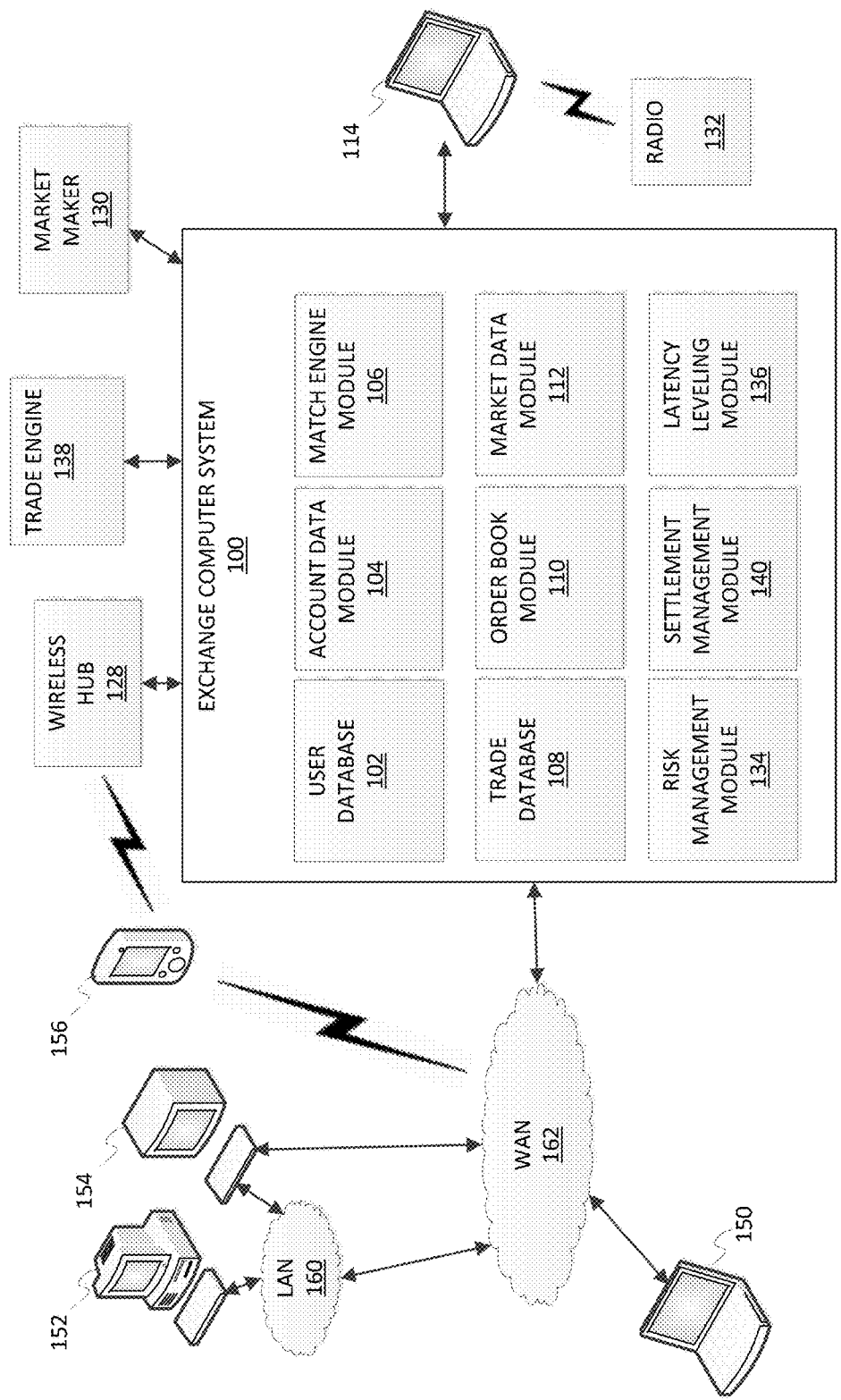
FIG. 1 depicts an exchange computer and network system, according to some embodiments.

An exemplary trading network environment for implementing trading systems and methods is shown in FIG. 1. An exchange computer system 100 receives messages that include orders and transmits market data related to orders and trades to users, such as via wide area network 162 and/or local area network 160 and computer devices 114, 150, 152, 154, and 156, as described herein, coupled with the exchange computer system 100.

Herein, the phrase "coupled with" is defined to mean directly connected to or indirectly connected through one or more intermediate components. Such intermediate components may include both hardware- and software-based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
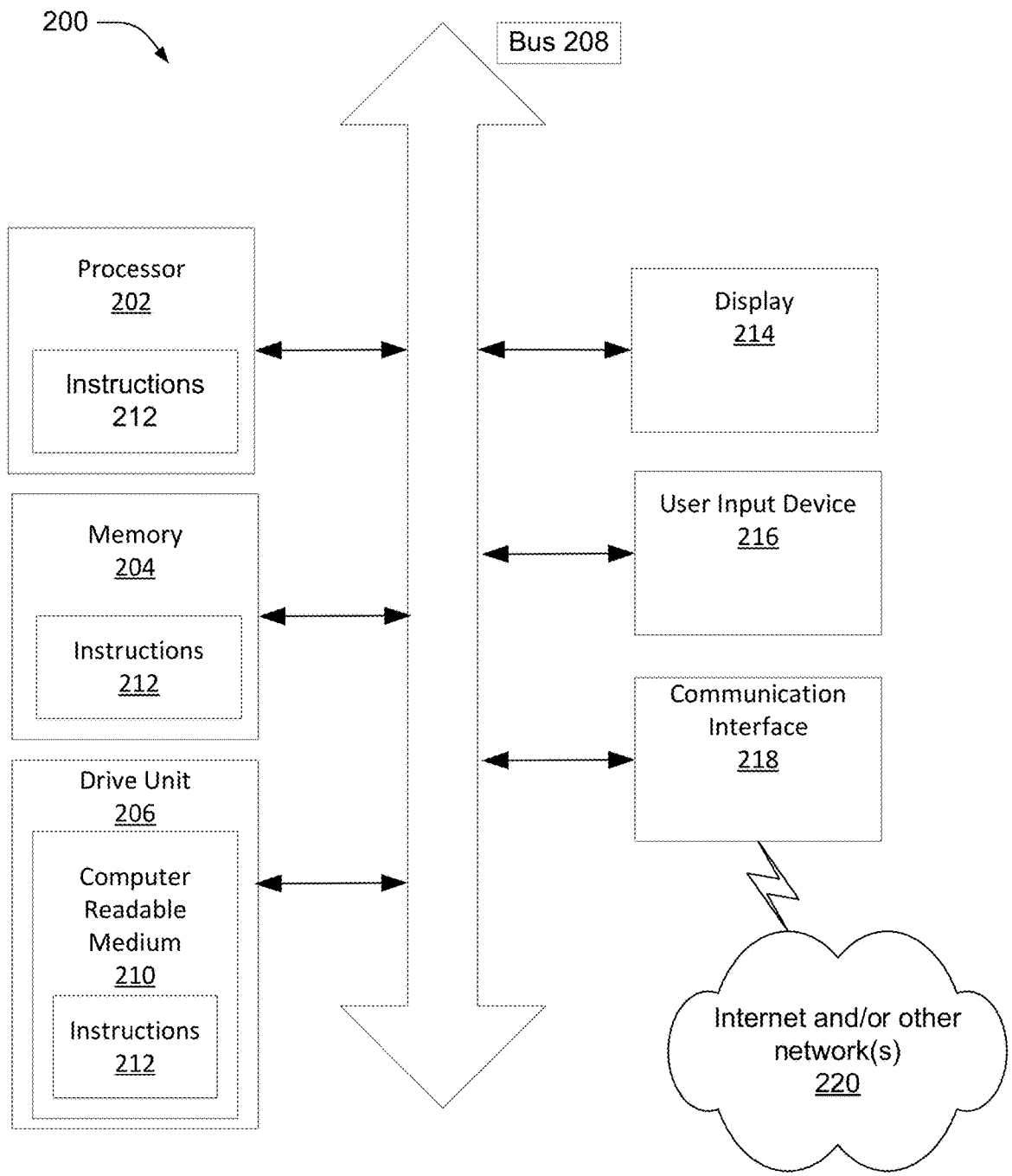
FIG. 2 depicts a general computer system, according to some embodiments.

The exchange computer system 100 may be implemented with one or more mainframes, desktops, or other computers, such as the example computer 200 described herein with respect to FIG. 2. A user database 102 may be provided which includes information identifying traders and other users of exchange computer system 100, such as account numbers or identifiers, usernames, and passwords. An account data module 104 may be provided which may process account information that may be used during trades. The account data module 104 may store relationship information for the participants of the exchange. For example, the account data module 104 may store credit relationship data that defines credit relationships between participants. The account data module 104 may store data that defines which participants other participants are willing to trade with or otherwise complete contracts. Certain participants, for example, may wish to avoid trading with a competitor or otherwise unwelcome trading partner. Certain participants may be denied the opportunity to trade with other participants due to regulatory actions or legal reasons.

A match, or matching, engine module 106 may be included to match bid and offer prices and may be implemented with software that executes one or more algorithms for matching bids and offers. A trade database 108 may be included to store information identifying trades and descriptions of trades. Trade database 108 may store information identifying the time that a trade took place and the contract price.

An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users. For example, the market data module 112 may prepare the market data feeds described herein.

A risk management module 134 may be included to compute and determine a user's risk utilization in relation to the user's defined risk thresholds. The risk management module 134 may also be configured to determine risk assessments or exposure levels in connection with positions held by a market participant. The risk management module 134 may be configured to administer, manage, or maintain one or more margining mechanisms implemented by the exchange computer system 100. Such administration, management or maintenance may include managing database records reflective of margin accounts of the market participants. In some embodiments, the risk management module 134 implements one or more aspects of the disclosed embodiments, including, for instance, principal component analysis (PCA) based margining, in connection with interest rate swap (IRS) portfolios, as described herein.

A latency leveling module/processor 136 may be included to implement the disclosed latency floor/leveling mechanism as will be described below. Alternatively, this functionality may be integrated with the match engine module 106.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement management module 140. A settlement management module 140 (or settlement processor or other payment processor) may be included to provide one or more functions related to settling or otherwise administering transactions cleared by the exchange. Settlement management module 140 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement management module 140 may be configured to communicate with the trade database 108 (or the memory(ies) in which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement management module 140 may be used to determine a mark to market amount on a daily basis during the term of the financial instrument. Such determinations may also be made on a settlement date for the financial instrument for the purposes of final settlement.

In some embodiments, the settlement management module 140 may be integrated to any desired extent with one or more of the other modules or processors of the exchange computer system 100. For example, the settlement management module 140 and the risk management module 134 may be integrated to any desired extent. In some cases, one or more margining procedures or other aspects of the margining mechanism(s) may be implemented by the settlement management module 140.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits (where traders, or their representatives, all physically stand in a designated location, i.e., a trading pit, and trade with each other via oral and visual/hand based communication) and/or other sources and incorporated into the trade and market data from the electronic trading system(s). It should be appreciated that concurrent processing limits may be defined by or imposed separately or in combination on one or more of the trading system components.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange computer system 100 for financial instruments. It should be appreciated that the disclosed embodiments may be implemented as a different or separate module of the exchange computer system 100, or a separate computer system coupled with the exchange computer system 100 to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, and 156 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100 via a network 162, such as via a T1 line, a common local area network (LAN) or other wired and/or wireless medium for connecting computer devices, such as the network 220 shown in FIG. 2 and described with respect thereto. Another exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 156, such as a mobile telephone, tablet-based computer device, or other wireless device, may communicate with the LAN 160 and/or the Internet 162 via radio waves, such as via Wi-Fi, Bluetooth® and/or a cellular telephone-based data communications protocol. PDA 156 may also communicate with exchange computer system 100 via a conventional wireless hub 128.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 154 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 150 may include computer-executable instructions for receiving market data from exchange computer system 100 and displaying that information to a user.

Numerous additional servers, computers, handheld devices, personal digital assistants, telephones, and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer-based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange Inc., of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In an embodiment, the computer system 200 can be implemented using electronic devices that provide voice, video, or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random-access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disk, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid-state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control, or any other device operative to interact with the system 200.

In an embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In an embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images, or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMAX network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. While the computer-readable medium is shown to be a single medium, the term "computer-readable medium" includes a single medium or multiple medium, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

Although the present specification describes components and functions that may be implemented in some embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical discs, or optical discs. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical discs; and CD ROM and DVD-ROM discs. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g., via computer executable software code, but whose form, e.g., the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

Figure 3:
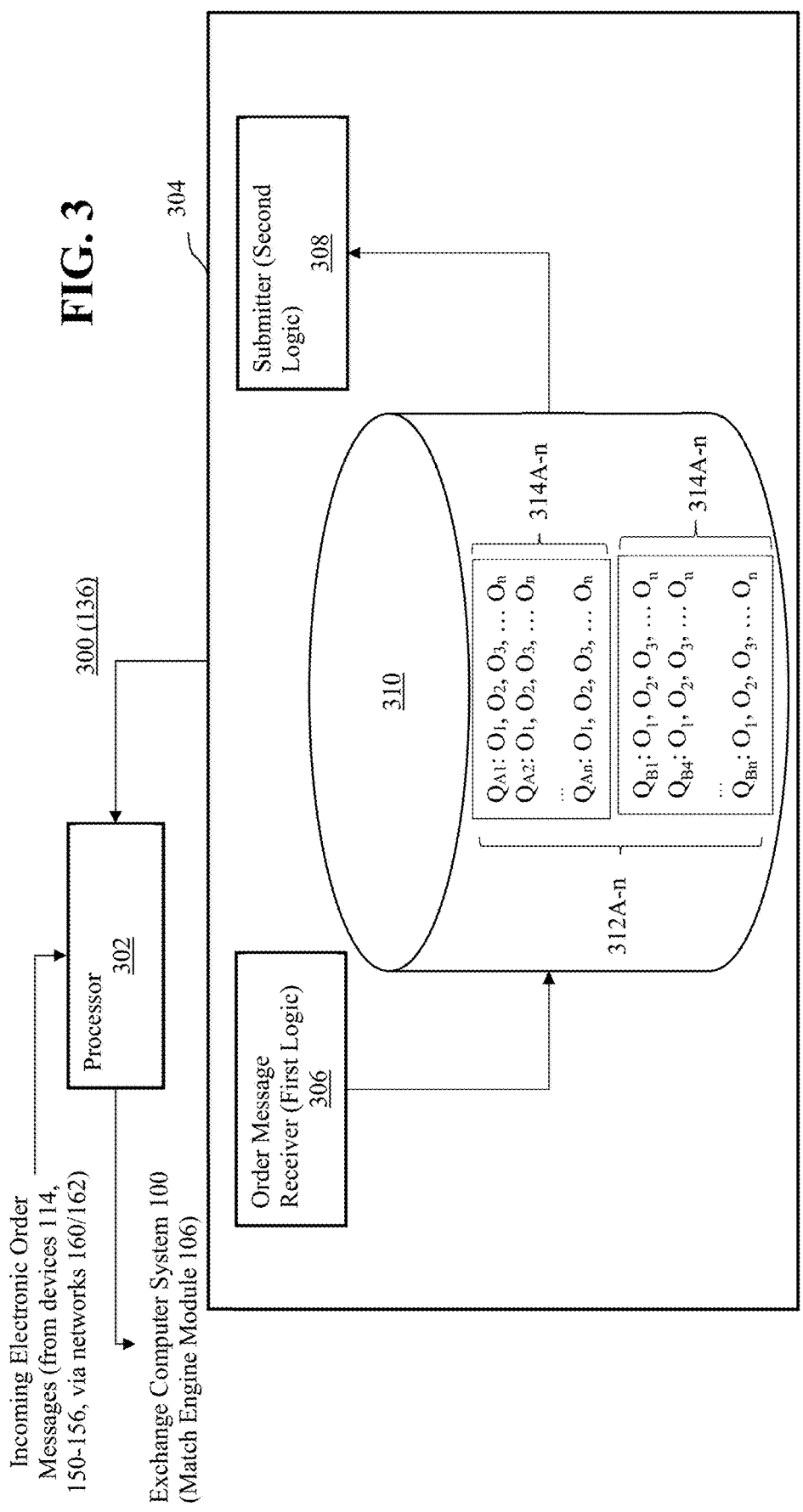
FIG. 3 depicts a block diagram of system for implementing a latency floor according to one embodiment.
Figure 4:
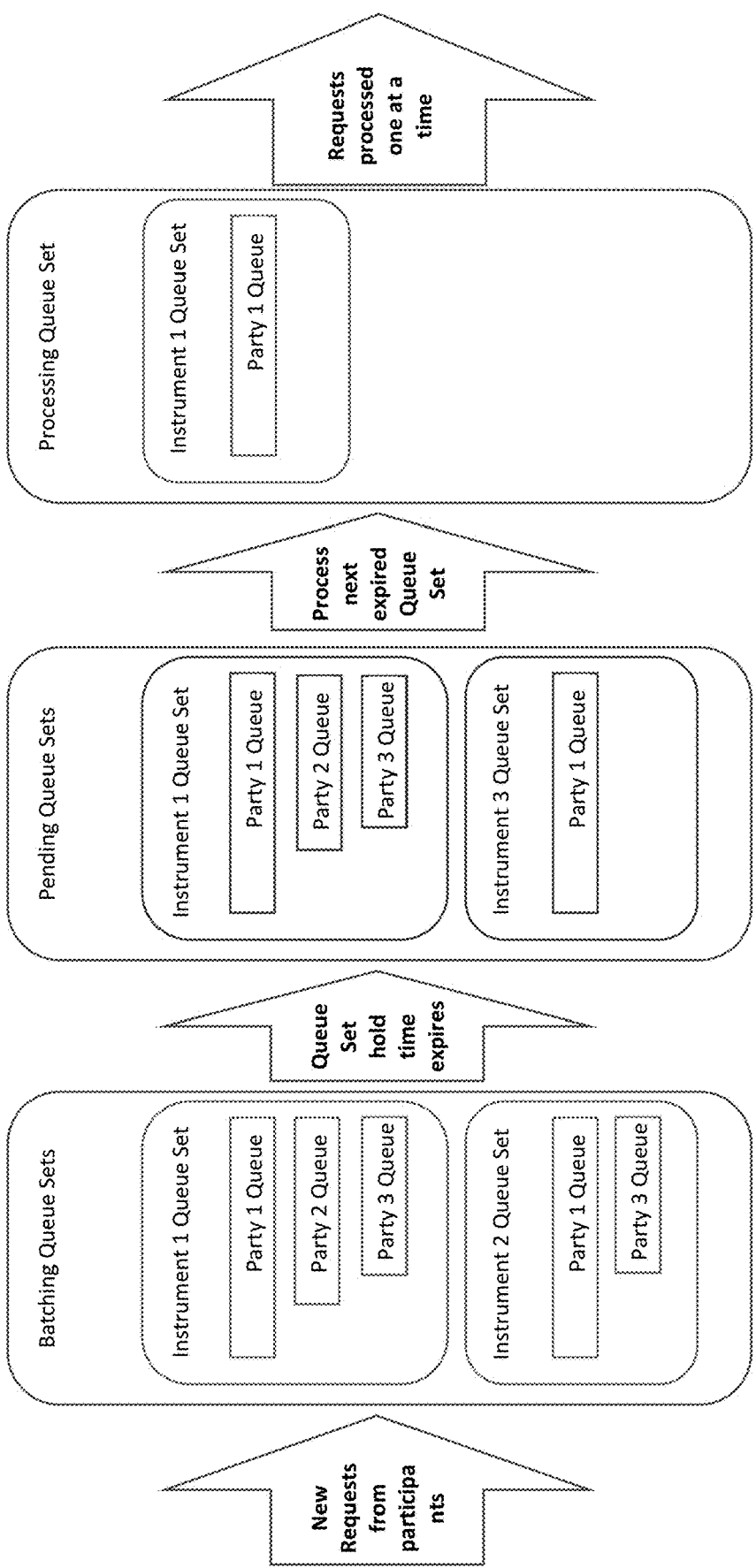
FIG. 4 illustrates the operation of prior latency floor implementations.

Referring to FIG. 3, there is shown one embodiment 300 of a latency leveling module or processor 136, also referred to as a server, for controlling submission of electronic order messages to an electronic trading system for matching may be implemented as a separate component of the exchange computer system 100, and coupled with the match engine module 106, or integrated with another module thereof, such as the match engine module 106.

The latency leveling processor 300 (136) may be implemented by a processor 302 and a memory 304, such as the processor 202, memory 204 described in detail above with reference to FIG. 2, where in the memory 304 is operative to store computer executable instructions, such as in the form of one or more logic components, that when executed by the processor 302, cause the processor 302 to operate as described herein. Alternatively, the computer executable instructions or logic components described herein may be implemented as one or more separate components, such as on an FPGA which may include a memory or reconfigurable component to store logic and a processing component to execute the stored logic.

In one embodiment, the latency leveling processor 300 is coupled with the matching engine 106 of the exchange computer system 100 of the electronic trading system, wherein, as described above, the matching engine 106 includes an order book database in which previously received but not fully satisfied data transaction requests, e.g. orders to trade, are stored based, at least in part, on time of receipt relative to each other, e.g. time or price time priority. In one implementation, the latency leveling processor is implemented in a Market Segment Gateway (MSG), described in more detail in U.S. Pat. No. 10,432,565.

The latency leveling processor 300 is operative or otherwise configured, e.g. the stored computer executable instructions are operative when executed by the processor 302, to cause the processor 302 to, for each of a first plurality of durations: receive, e.g., by an order receiver 306 which may be implemented with first logic stored in the memory 304 or as a process or thread, subsequent to the initiation of the duration and prior to the expiry thereof, from a party of a plurality of parties, e.g., from their trading devices 114, 150-156, trading on the electronic trading system, an electronic order message for trading a first instrument, such as a futures contract, of a plurality of instruments. Wherein each of the first plurality of durations is characterized by an initiation and a subsequent expiry, the initiation of each of the first plurality of durations, i.e., batch windows, being subsequent to expiry of another of the first plurality of durations. The electronic order messages, which may include orders/requests to trade (buy or sell) a quantity of a financial instrument, requests to cancel a previously submitted order to trade, or request to modify a previously submitted order to trade, etc., may be received from the trading devices 114, 150-156 of the parties via an electronic communications network, such as the networks 160, 162 described above. A timer or timing circuit (not shown) may be used to define/delimit the length of the duration. Depending upon the implementation, the duration may be from 1 to 10 ms, but typically 1 to 3 ms. It will be appreciated that the length of the duration/batch window is implementation dependent and that all lengths are contemplated herein. In one embodiment, the duration length of each duration is randomly determined, with a minimum and maximum duration being defined by the system. Alternatively, the duration length of each duration may be fixed. In one alternative embodiment, one of the beginning or end of each duration may be defined by the occurrence of an event, such as the receipt of an incoming electronic order message initiating a duration and/or receipt/accumulation of a defined number of incoming order messages defining the end of the duration. While the initiation of one duration may follow the expiry of a prior duration, durations need not be continuous and a subsequent duration may be initiated immediately upon expiration of a prior duration or at a later time thereafter. In one embodiment, regardless of transaction type, e.g., request to trade, modify or cancel, the received order messages are processed in the same manner as described. In an alternative embodiment, requests to cancel or modify previously submitted orders to trade may be processed differently from requests to trade a financial instrument. For example, requests to cancel or modify may bypass the batching and be immediately applied to the previously submitted order assuming it has not yet been processed by the matching engine yet.

The stored computer executable instructions are further operative, when executed by the processor 302, to cause the processor 302, e.g., the order receiver 306, to store the received electronic order message in a storage device 310 coupled with the latency leveling processor 300, the electronic order message being stored in the storage device together with other stored electronic order messages for trading the first instrument previously received subsequent to the initiation of the duration and prior to the expiry thereof, wherein the electronic order messages received from a same party or source/origination are further stored together in the storage device 310. In one embodiment, the storage device 310 includes a database stored in the memory 304 or elsewhere, e.g., a buffer, memory or other electronic data storage device. In one embodiment, the storage device 310 includes a database structured, i.e., configured with data structures, to store electronic order messages for a given instrument together 312 in a set of queues 314, one queue for each party from which electronic messages for the instrument have been received, the queues for given instrument being referred to as a queue set or a batch. Each queue set and/or the queues therefore may be pre-defined or created on demand, e.g., as electronic order messages are received. In one embodiment, incoming electronic order messages for a particular instrument are stored, i.e., in the queue associated with the party from which the message was received, in the order of receipt. Alternatively, the incoming electronic order messages are stored in the queues in a random order. It will be appreciated that the received electronic order messages may include an identifier or other indicator of the origin thereof which the disclosed embodiments may evaluate to determine when electronic order messages are received from the same party/source. In one embodiment, the latency leveling processor 300 accesses a database or table of trading entities using the identifier included in the electronic order message so as to determine the source of the message and/or whether that message is from a source/origin that is the same as, or related, in a manner considered to be the same as, a source from a previously received electronic order message originated from. It will be appreciated that the identifiers within the messages may be sufficient to make such a determination obviating the need to check a database, etc. For example, order messages received from the same trading floor or brokerage may be considered to have been received from the same party/source.

The stored computer executable instructions are further operative, when executed by the processor 302, to cause the processor 302, e.g., via either the order receiver 306 or the order submitter 308, to, upon expiry of the duration, make each of the stored received electronic order messages received subsequent to the initiation of the duration and prior to the expiry thereof, i.e., within the batch window, available for submission to the electronic trading system for matching thereby, regardless of whether or not all of the stored received electronic order messages received prior to expiry of a previously expired duration of the first plurality of durations have been submitted to the electronic trading system. In one embodiment, the accumulated electronic order messages are appended to any remaining electronic order messages of prior batches, i.e., to the previously accumulated electronic order messages for each instrument for each party, that were previously made available for submission and are still awaiting submission as will be described. In one embodiment, making the electronic order messages available for submission may be logically performed by designating the electronic order messages stored in the storage device 310 as such, e.g., by setting a flag in association therewith or other designation or encoding. Alternatively, those electronic order messages being made available for submission may be transferred to a different memory or portion thereof to await submission. Nevertheless, in the disclosed embodiments, electronic order messages received from a particular party for a particular instrument will be logically and/or physically grouped or otherwise appended to previously received and made available electronic order messages, if any, from that same party/source for that same instrument which are still awaiting submission.

The latency leveling processor 300 is further operative or otherwise configured, e.g. the stored computer executable instructions are operative, when executed by the processor 302, to cause the processor 302, to submit, e.g., by an order submitter or order submission process 308 which may be implemented with second logic stored in the memory 304 or as a process or thread, each of the stored received electronic order messages made available therefore to the electronic trading system, i.e., the matching engine 106, via selection of, for each instrument of the plurality of instruments for which there are stored received electronic order messages made available for submission and for each party from which those stored received electronic order messages were received, one of the stored received electronic order messages received from that party and transmit, communicate or otherwise convey the selected electronic order message to the electronic trading system, e.g., such as via a communications network, or application program interface, until all of the stored received electronic order messages that have been made available for submission have been transmitted to the electronic trading system/matching engine. Where there are no prior electronic order messages awaiting submission, the order submitter 308 may select the first to be submitted order message, for example, at random from among the most recently made available electronic order messages, subsequently selecting and submitting, in turn, from the available messages of each party of each instrument. Alternatively, other initial selection criteria may be used, such as selecting the party which has the fewest queued messages awaiting submission, etc. That is, the disclosed embodiments ensure that on each submission cycle, one order from each party having available messages from each instrument are submitted before going back to waiting messages for a same party/same instrument. For a given party and instrument, the disclosed embodiments may select order messages submission in the order which they are stored (which, as described above, may be random or in the order or receipt) or randomly. As will be appreciated, because the disclosed embodiments submit one order message from each party and each instrument in turn, a high volume of order messages received from one party for a particular instrument will not delay the submission of order messages from other parties for the same or a different instrument. More particularly, each party of the plurality of parties may utilize a trading infrastructure which is designed or otherwise optimized to rapidly generate electronic order messages, e.g., rapidly process incoming data, such as market data, and generate order messages based thereon, and/or be coupled with the electronic trading system via an electronic communications network characterized by a latency different from a latency characterizing the electronic communications network which couples another party of the plurality of parties with the electronic trading system. The delay/time for a given party to receive data, such as market data, process that data, generate an order message based thereon and communicate that order message back to the trading system may be referred to as the "tick-to-trade" time, delay or latency and is a function of the variations in order processing latency of the parties' infrastructure and in the network connections with the electronic trading system. These differences may result in an electronic order message of one party and another electronic order message of another party, both responsive to the same event, being received by the electronic trading system at different times within the same duration of the first plurality of durations. Where those electronic order messages are received within the same duration/batch window, as described above the earlier received message may be processed after the later received message.

As was discussed, the disclosed embodiments store incoming electronic order messages for a given financial instrument/product together, wherein those incoming electronic order messages are further stored and/or organized based on the source from which they originated. In particular, the latency leveling processor 300 is further operative or otherwise configured, e.g. the stored computer executable instructions are operative, when executed by the processor 302, to cause the processor 302, to, for each of a second plurality of durations, each characterized by an initiation and a subsequent expiry, the initiation of each of the second plurality of durations being subsequent to expiry of another of the second plurality of durations: receive, subsequent to the initiation of the duration and prior to the expiry thereof, from a party of the plurality of parties trading on the electronic trading system, an electronic order message for trading a second instrument; store the received electronic order message in the storage device, the electronic order message being stored in the storage device together with other stored electronic order messages for the second instrument previously received subsequent to the initiation of the duration and prior to the expiry thereof, wherein the electronic order messages received from a same party/source are further stored together in the storage device; and upon expiry of the duration, make each of the stored received electronic order messages received subsequent to the initiation of the duration and prior to the expiry thereof available for submission to the electronic trading system for matching thereby, regardless of whether or not all of the stored received electronic order messages received prior to expiry of a previously expired duration of the second plurality of durations have been submitted to the electronic trading system. In one embodiment, the first and second durations are the same, i.e., incoming electronic order messages for either instrument are received during the same batch window. In alternative embodiments, different instruments may have different batch windows/durations which may or may not overlap.

Figure 9:
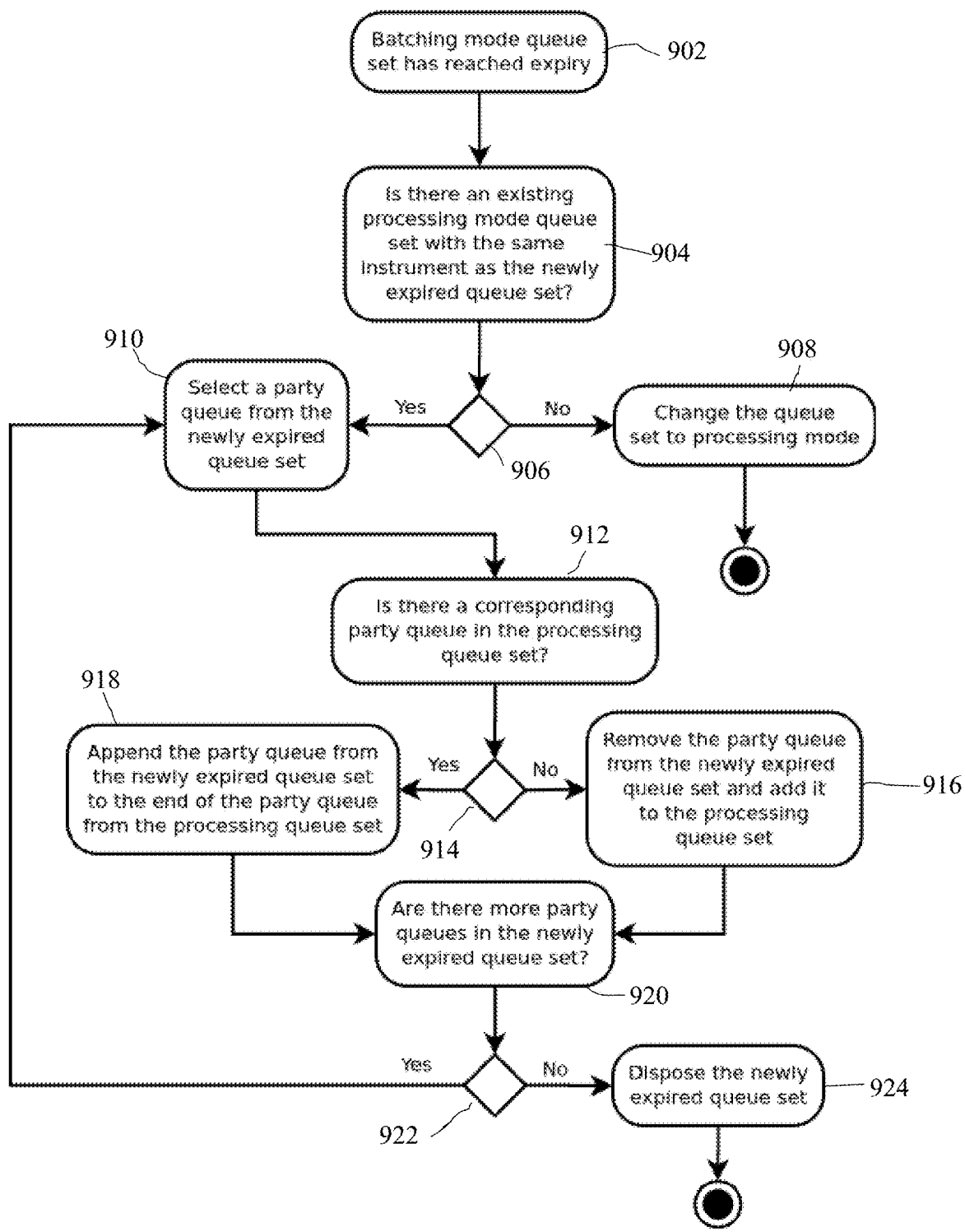
FIGS. 9 and 10 depict flow charts showing operation of the system of FIG. 3 according to one embodiment.
Figure 10:
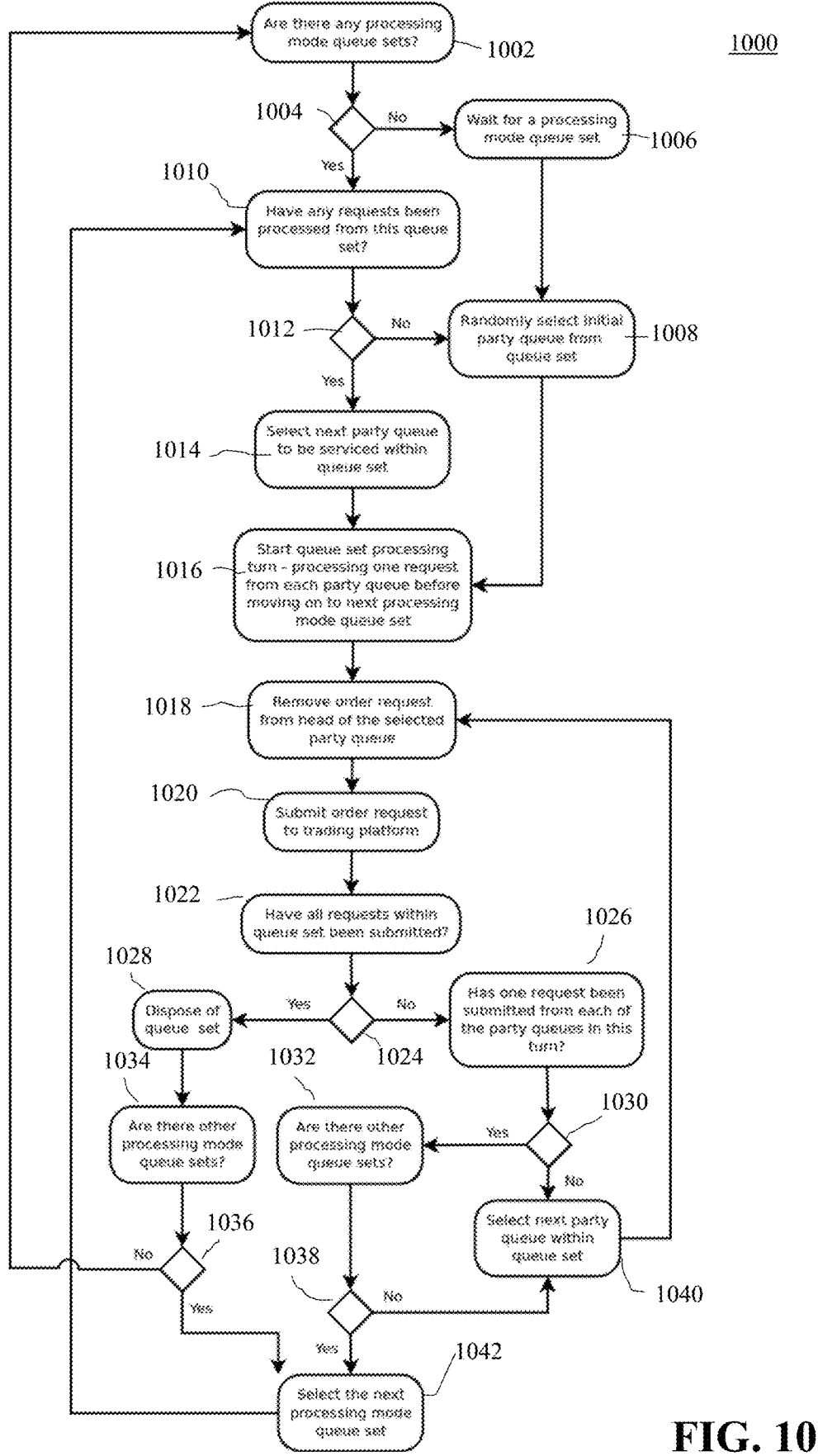

FIGS. 6, 9 and 10 depict flow charts 800, 900, 1000 showing the operation of the system 300 for controlling submission of electronic order messages to an electronic trading system for matching according to one embodiment. The operation of the system 300 includes: for each of a first plurality of durations, each characterized by an initiation and a subsequent expiry, typically of a few milliseconds and preferably less than 10 ms and still more preferably 1 to 3 ms, the initiation of each of the first plurality of durations being subsequent, but not necessarily immediate, to expiry of another of the first plurality of durations: receiving, by a processor 302, e.g., a thread/process executing thereon, via an electronic communications network 160/162, subsequent to the initiation of the duration and prior to the expiry thereof, from a party of a plurality of parties trading on the electronic trading system, e.g. trading devices 114, 150-156, an electronic order message for trading a first instrument of a plurality of instruments (Block 602); storing, by the processor 302, the received electronic order message in a storage device 310, e.g., buffer/memory, coupled with the processor 302, the electronic order message being stored in the storage device 310 together with other stored electronic order messages for trading the first instrument, e.g., in a queue set/batch which may be created on demand, previously received subsequent to the initiating of the duration and prior to the expiry thereof, wherein the electronic order messages received from a same party/source/origin are further stored, in the order or receipt or in a random order, together in the storage device 310, e.g., within a same queue within the queue set and which may be created on demand (Blocks 604, 606, 608, 610, 612, 614, 616, 618); and upon expiry of the duration, making, by the processor, each of the stored received electronic order messages received subsequent to the initiation of the duration and prior to the expiry thereof available for submission to the electronic trading system for matching thereby, regardless of whether or not all of the stored received electronic order messages received prior to expiry of a previously expired duration of the first plurality of durations have been submitted to the electronic trading system, i.e., appending or otherwise adding, logically and/or physically the newly made available electronic order messages to any previously made available electronic order messages still awaiting submission (Blocks 902, 904, 906, 908, 910, 912, 914, 916, 918, 920, 922, 924); and submitting, by the processor 302, e.g. via a thread/process executing thereon, each of the stored received electronic order messages made available therefore to the electronic trading system, i.e., to the matching engine 106, by selecting, e.g., randomly whether or not stored in random order, or not, for each instrument of the plurality of instruments for which there are stored received electronic order messages made available for submission and for each party, e.g. starting with a random party when starting from an idle state, from which those stored received electronic order messages were received, one of the stored received electronic order messages received from that party and transmitting the selected electronic order message to the electronic trading system, i.e., to the matching engine 106 thereof, until all of the stored received electronic order messages that have been made available for submission have been transmitted to the electronic trading system (Blocks 1002, 1004, 1006, 1008, 1010, 1012, 1014, 1016, 1018, 1020, 1022, 1024, 1026, 1028, 1030, 1032, 1034, 1036, 1038, 1040, 1042).

The operation of the system 300 may further include: for each of a second plurality of durations, which may or may not overlap at least partially with the first plurality of durations, each characterized by an initiation and a subsequent expiry, either of which may be randomly defined or fixed, the initiation of each of the second plurality of durations being subsequent, but not necessarily immediate/continuous with, to expiry of another of the second plurality of durations: receiving, by a processor subsequent to the initiation of the duration and prior to the expiry thereof, from a party of the plurality of parties trading on the electronic trading system, an electronic order message for trading a second instrument (Block 602); storing, by the processor, the received electronic order message in the storage device coupled with the processor, the electronic order message being stored in the storage device together with other stored electronic order messages for the second instrument previously received subsequent to the initiating of the duration and prior to the expiry thereof, wherein the electronic order messages received from a same party are further stored together in the storage device (Blocks 604, 606, 608, 610, 612, 614, 616, 618); and upon expiry of the duration, making, by the processor each of the stored received electronic order messages received subsequent to the initiation of the duration and prior to the expiry thereof available for submission to the electronic trading system for matching thereby, regardless of whether or not all of the stored received electronic order messages received prior to expiry of a previously expired duration of the second plurality of durations have been submitted to the electronic trading system (Blocks 902, 904, 906, 908, 910, 912, 914, 916, 918, 920, 922, 924).

In one embodiment, the initiation of each duration of the first plurality of durations occurs immediately subsequent to the expiry of another duration of the first plurality of durations.

In one embodiment, the electronic order messages for trading the first instrument received from the same party are stored together in an order of receipt therefrom in the storage device.

In one embodiment, the submitting further comprises selecting, for each of the plurality of instruments having stored received electronic order messages therefore made available for submission, in turn from each party, a stored received electronic order message for the instrument made available for submission, wherein when there are no stored received electronic order messages for that instrument received prior to expiry of a duration which expired prior to the expiration of the most recent duration of the first plurality of durations waiting to be submitted to the electronic trading system, selecting, at random, a stored received electronic order message for the instrument made available for submission, and selecting in turn from each party thereafter.

In one embodiment, the stored received electronic order message for one party is selected for transmission randomly from among all of the stored received electronic order message for the one party.

In one embodiment, the stored received electronic order message for one party is selected for transmission based on order of receipt from among all of the stored received electronic order message for the one party.

In one embodiment, each party of the plurality of parties/sources is coupled with the electronic trading system via a trading infrastructure and/or an electronic communications network characterized by a latency, e.g., tick-to-trade latency, different from a latency characterizing the electronic communications network which couples another party of the plurality of parties with the electronic trading system, the difference resulting in an electronic order message of one party and another electronic order message of another party, both responsive to the same event, being received by the electronic trading system at different times within the same duration of the first plurality of durations.

In one embodiment, the storage device 310 comprises a plurality of queues 314, the storing further comprising selecting one of the plurality of queues into which to store the received electronic order message. In one embodiment, the selecting comprises selecting an empty queue 314n of the plurality of queues 314 when the received electronic order messages is the first electronic order message for the first instrument received from a party of the plurality of parties during the duration. In one embodiment, the electronic order messages received from the same party/source are further stored together in the same queue 314 in the storage device 310.

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the implementations. Accordingly, the implementations are not limited except as by the appended claims.

Reference in this specification to "one implementation," "an implementation," or "some implementations" means that a particular feature, structure, or characteristic described in connection with the implementation is included in at least one implementation of the disclosure. The appearances of the phrase "in some implementations" in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various implementations given in this specification.

Those skilled in the art will appreciate that the logic illustrated in each of the flow diagrams discussed above may be altered in various ways. For example, the order of the logic may be rearranged, substeps may be performed in parallel, illustrated logic may be omitted; other logic may be included, etc.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Without intent to further limit the scope of the disclosure, examples of instruments, apparatus, methods and their related results according to the implementations of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for controlling submission of electronic order messages to an electronic trading system for matching, the method comprising:
   for each of a first plurality of durations, each characterized by an initiation and a subsequent expiry, the initiation of each of the first plurality of durations being subsequent to expiry of another of the first plurality of durations:
      receiving, by a processor subsequent to the initiation of the duration and prior to the expiry thereof, from a party of a plurality of parties trading on the electronic trading system, an electronic order message for trading a first instrument of a plurality of instruments;
      storing, by the processor, the received electronic order message in a storage device coupled with the processor, the electronic order message being stored in the storage device together with other stored electronic order messages for trading the first instrument previously received subsequent to the initiating of the duration and prior to the expiry thereof, wherein the electronic order messages received from a same party are further stored together in the storage device; and
      upon expiry of the duration, making, by the processor, each of the stored received electronic order messages received subsequent to the initiation of the duration and prior to the expiry thereof available for submission to the electronic trading system for matching thereby, regardless of whether or not all of the stored received electronic order messages received prior to expiry of a previously expired duration of the first plurality of durations have been submitted to the electronic trading system; and
   submitting, by the processor, each of the stored received electronic order messages made available therefore to the electronic trading system, by selecting, for each instrument of the plurality of instruments for which there are stored received electronic order messages made available for submission and for each party from which those stored received electronic order messages were received, one of the stored received electronic order messages received from that party and transmitting the selected electronic order message to the electronic trading system, until all of the stored received electronic order messages that have been made available for submission have been transmitted to the electronic trading system.

2. The computer implemented method of claim 1, further comprising:
   for each of a second plurality of durations, each characterized by an initiation and a subsequent expiry, the initiation of each of the second plurality of durations being subsequent to expiry of another of the second plurality of durations:
      receiving, by a processor subsequent to the initiation of the duration and prior to the expiry thereof, from a party of the plurality of parties trading on the electronic trading system, an electronic order message for trading a second instrument;
      storing, by the processor, the received electronic order message in the storage device coupled with the processor, the electronic order message being stored in the storage device together with other stored electronic order messages for the second instrument previously received subsequent to the initiating of the duration and prior to the expiry thereof, wherein the electronic order messages received from a same party are further stored together in the storage device; and
      upon expiry of the duration, making, by the processor each of the stored received electronic order messages received subsequent to the initiation of the duration and prior to the expiry thereof available for submission to the electronic trading system for matching thereby, regardless of whether or not all of the stored received electronic order messages received prior to expiry of a previously expired duration of the second plurality of durations have been submitted to the electronic trading system.

3. The computer implemented method of claim 1, wherein the initiation of each duration of the first plurality of durations occurs immediately subsequent to the expiry of another duration of the first plurality of durations.

4. The computer implemented method of claim 1, wherein the electronic order messages for trading the first instrument received from the same party are stored together in an order of receipt therefrom in the storage device.

5. The computer implemented method of claim 1, wherein the submitting further comprises selecting, for each of the plurality of instruments having stored received electronic order messages therefore made available for submission, in turn from each party, a stored received electronic order message for the instrument made available for submission, wherein when there are no stored received electronic order messages for that instrument received prior to expiry of a duration which expired prior to the expiration of the most recent duration of the first plurality of durations waiting to be submitted to the electronic trading system, selecting, at random, a stored received electronic order message for the instrument made available for submission, and selecting in turn from each party thereafter.

6. The computer implemented method of claim 1, wherein the stored received electronic order message for one party is selected for transmission randomly from among all of the stored received electronic order message for the one party.

7. The computer implemented method of claim 1, wherein the stored received electronic order message for one party is selected for transmission based on order of receipt from among all of the stored received electronic order message for the one party.

8. The computer implemented method of claim 1, wherein each party of the plurality of parties is coupled with the electronic trading system via an electronic communications network characterized by a latency different from a latency characterizing the electronic communications network which couples another party of the plurality of parties with the electronic trading system, the difference resulting in an electronic order message of one party and another electronic order message of another party, both responsive to the same event, being received by the electronic trading system at different times within the same duration of the first plurality of durations.

9. The computer implemented method of claim 1, wherein the storage device comprises a plurality of queues, the storing further comprising selecting one of the plurality of queues into which to store the received electronic order message.

10. The computer implemented method of claim 9, wherein the selecting comprises selecting an empty queue of the plurality of queues when the received electronic order messages is the first electronic order message for the first instrument received from a party of the plurality of parties during the duration.

11. The computer implemented method of claim 9, wherein the electronic order messages received from the same party are further stored together in the same queue in the storage device.

12. The computer implemented method of claim 1, wherein the expiry of each of the first plurality of durations is random.

13. A non-transitory tangible computer readable medium comprising computer-executable instructions for controlling submission of electronic order messages to an electronic trading system for matching that, when executed on a computer implemented trading system, cause the computer implemented trading system to:
  for each of a first plurality of durations, each characterized by an initiation and a subsequent expiry, the initiation of each of the first plurality of durations being subsequent to expiry of another of the first plurality of durations:
    receive, subsequent to the initiation of the duration and prior to the expiry thereof, from a party of a plurality of parties trading on the electronic trading system, an electronic order message for trading a first instrument of a plurality of instruments;
    store the received electronic order message in a storage device coupled with the electronic trading system, the electronic order message being stored in the storage device together with other stored electronic order messages for trading the first instrument previously received subsequent to the initiation of the duration and prior to the expiry thereof, wherein the electronic order messages received from a same party are further stored together in the storage device; and
    upon expiry of the duration, make each of the stored received electronic order messages received subsequent to the initiation of the duration and prior to the expiry thereof available for submission to the electronic trading system for matching thereby, regardless of whether or not all of the stored received electronic order messages received prior to expiry of a previously expired duration of the first plurality of durations have been submitted to the electronic trading system; and
  submit each of the stored received electronic order messages made available therefore to the electronic trading system, via selection of, for each instrument of the plurality of instruments for which there are stored received electronic order messages made available for submission and for each party from which those stored received electronic order messages were received, one of the stored received electronic order messages received from that party and transmitting the selected electronic order message to the electronic trading system, until all of the stored received electronic order messages that have been made available for submission have been transmitted to the electronic trading system.

14. The non-transitory tangible computer readable medium of claim 13, wherein the computer executable instructions, when further executed on the computer implemented trading system, cause the computer implemented trading system to:
  for each of a second plurality of durations, each characterized by an initiation and a subsequent expiry, the initiation of each of the second plurality of durations being subsequent to expiry of another of the second plurality of durations:
    receive, subsequent to the initiation of the duration and prior to the expiry thereof, from a party of the plurality of parties trading on the electronic trading system, an electronic order message for trading a second instrument;
    store the received electronic order message in the storage device, the electronic order message being stored in the storage device together with other stored electronic order messages for the second instrument previously received subsequent to the initiation of the duration and prior to the expiry thereof, wherein the electronic order messages received from a same party are further stored together in the storage device; and
    upon expiry of the duration, make each of the stored received electronic order messages received subsequent to the initiation of the duration and prior to the expiry thereof available for submission to the electronic trading system for matching thereby, regardless of whether or not all of the stored received electronic order messages received prior to expiry of a previously expired duration of the second plurality of durations have been submitted to the electronic trading system.

15. The non-transitory tangible computer readable medium of claim 13, wherein the initiation of each duration of the first plurality of durations occurs immediately subsequent to the expiry of another duration of the first plurality of durations.

16. The non-transitory tangible computer readable medium of claim 13, wherein the electronic order messages for trading the first instrument received from the same party are stored together in an order of receipt therefrom in the storage device.

17. The non-transitory tangible computer readable medium of claim 13, wherein the computer executable instructions, when further executed on the computer implemented trading system, cause the computer implemented trading system to:
  select, for each of the plurality of instruments having stored received electronic order messages therefore made available for submission, in turn from each party, a stored received electronic order message for the instrument made available for submission, wherein when there are no stored received electronic order messages for that instrument received prior to expiry of a duration which expired prior to the expiration of the most recent duration of the first plurality of durations waiting to be submitted to the electronic trading system, selecting, at random, a stored received electronic order message for the instrument made available for submission, and selecting in turn from each party thereafter.

18. The non-transitory tangible computer readable medium of claim 13, wherein the stored received electronic order message for one party is selected for transmission randomly from among all of the stored received electronic order message for the one party.

19. The non-transitory tangible computer readable medium of claim 13, wherein the stored received electronic order message for one party is selected for transmission based on order of receipt from among all of the stored received electronic order message for the one party.

20. The non-transitory tangible computer readable medium of claim 13, wherein each party of the plurality of parties is coupled with the electronic trading system via an electronic communications network characterized by a latency different from a latency characterizing the electronic communications network which couples another party of the plurality of parties with the electronic trading system, the difference resulting in an electronic order message of one party and another electronic order message of another party, both responsive to the same event, being received by the electronic trading system at different times within the same duration of the first plurality of durations.

21. The non-transitory tangible computer readable medium of claim 13, wherein the storage device comprises a plurality of queues and further wherein the computer executable instructions, when further executed on the computer implemented trading system, cause the computer implemented trading system to select one of the plurality of queues into which to store the received electronic order message.

22. The non-transitory tangible computer readable medium of claim 21, wherein the computer executable instructions, when further executed on the computer implemented trading system, cause the computer implemented trading system to select an empty queue of the plurality of queues when the received electronic order messages is the first electronic order message for the first instrument received from a party of the plurality of parties during the duration.

23. The non-transitory tangible computer readable medium of claim 21, wherein the electronic order messages received from the same party are further stored together in the same queue in the storage device.

24. The non-transitory tangible computer readable medium of claim 13, wherein the expiry of each of the first plurality of durations is random.

25. A system for controlling submission of orders to an electronic trading system for matching, the system comprising:
a latency leveling processor configured to, for each of a first plurality of durations, each characterized by an initiation and a subsequent expiry, the initiation of each of the first plurality of durations being subsequent to expiry of another of the first plurality of durations:
receive, subsequent to the initiation of the duration and prior to the expiry thereof, from a party of a plurality of parties trading on the electronic trading system, an electronic order message for trading a first instrument of a plurality of instruments;
store the received electronic order message in a storage device coupled with the latency leveling processor, the electronic order message being stored in the storage device together with other stored electronic order messages for trading the first instrument previously received subsequent to the initiation of the duration and prior to the expiry thereof, wherein the electronic order messages received from a same party are further stored together in the storage device; and
upon expiry of the duration, make each of the stored received electronic order messages received subsequent to the initiation of the duration and prior to the expiry thereof available for submission to the electronic trading system for matching thereby, regardless of whether or not all of the stored received electronic order messages received prior to expiry of a previously expired duration of the first plurality of durations have been submitted to the electronic trading system; and
wherein the latency leveling processor is further configured to submit each of the stored received electronic order messages made available therefore to the electronic trading system, via selection of, for each instrument of the plurality of instruments for which there are stored received electronic order messages made available for submission and for each party from which those stored received electronic order messages were received, one of the stored received electronic order messages received from that party and transmitting the selected electronic order message to the electronic trading system, until all of the stored received electronic order messages that have been made available for submission have been transmitted to the electronic trading system.

26. The system of claim 25, wherein:
the latency leveling processor is further configured to, for each of a second plurality of durations, each characterized by an initiation and a subsequent expiry, the initiation of each of the second plurality of durations being subsequent to expiry of another of the second plurality of durations:
receive, subsequent to the initiation of the duration and prior to the expiry thereof, from a party of the plurality of parties trading on the electronic trading system, an electronic order message for trading a second instrument;
store the received electronic order message in the storage device, the electronic order message being stored in the storage device together with other stored electronic order messages for the second instrument previously received subsequent to the initiation of the duration and prior to the expiry thereof, wherein the electronic order messages received from a same party are further stored together in the storage device; and
upon expiry of the duration, make each of the stored received electronic order messages received subsequent to the initiation of the duration and prior to the expiry thereof available for submission to the electronic trading system for matching thereby, regardless of whether or not all of the stored received electronic order messages received prior to expiry of a previously expired duration of the second plurality of durations have been submitted to the electronic trading system.

27. The system of claim 25, wherein the initiation of each duration of the first plurality of durations occurs immediately subsequent to the expiry of another duration of the first plurality of durations.

28. The system of claim 25, wherein the electronic order messages for trading the first instrument received from the same party are stored together in an order of receipt therefrom in the storage device.

29. The system of claim 25, wherein the latency leveling processor is further configured to select, for each of the plurality of instruments having stored received electronic order messages therefore made available for submission, in turn from each party, a stored received electronic order message for the instrument made available for submission, wherein when there are no stored received electronic order messages for that instrument received prior to expiry of a duration which expired prior to the expiration of the most recent duration of the first plurality of durations waiting to be submitted to the electronic trading system, selecting, at random, a stored received electronic order message for the instrument made available for submission, and selecting in turn from each party thereafter.

30. The system of claim 25, wherein the stored received electronic order message for one party is selected for transmission randomly from among all of the stored received electronic order message for the one party.

31. The system of claim 25, wherein the stored received electronic order message for one party is selected for transmission based on order of receipt from among all of the stored received electronic order message for the one party.

32. The system of claim 25, wherein each party of the plurality of parties is coupled with the electronic trading system via an electronic communications network characterized by a latency different from a latency characterizing the electronic communications network which couples another party of the plurality of parties with the electronic trading system, the difference resulting in an electronic order message of one party and another electronic order message of another party, both responsive to the same event, being received by the electronic trading system at different times within the same duration of the first plurality of durations.

33. The system of claim 25, wherein the storage device comprises a plurality of queues, the latency leveling processor being further configured to select one of the plurality of queues into which to store the received electronic order message.

34. The system of claim 33, wherein the latency leveling processor is further configured to select an empty queue of the plurality of queues when the received electronic order messages is the first electronic order message for the first instrument received from a party of the plurality of parties during the duration.

35. The system of claim 33, wherein the electronic order messages received from the same party are further stored together in the same queue in the storage device.

36. The system of claim 25, wherein the expiry of each of the first plurality of durations is random.

* * * * *